United States Patent
Herickhoff et al.

(10) Patent No.: US 9,378,532 B2
(45) Date of Patent: Jun. 28, 2016

(54) SAFETY MONITORING METHOD AND SYSTEM

(71) Applicant: Three H, LLC, Wellington, CO (US)

(72) Inventors: Lisa A. Herickhoff, Fort Collins, CO (US); James A. Herickhoff, Fort Collins, CO (US); Ruth A. Herickhoff, Fort Collins, CO (US)

(73) Assignee: Three H, LLC, Wellington, CO (US)

( * ) Notice: Subject to any disclaimer, the term of this patent is extended or adjusted under 35 U.S.C. 154(b) by 321 days.

(21) Appl. No.: 14/017,082

(22) Filed: Sep. 3, 2013

(65) Prior Publication Data

US 2014/0019184 A1   Jan. 16, 2014

Related U.S. Application Data

(63) Continuation of application No. 12/741,817, filed as application No. PCT/US2008/082661 on Nov. 6, 2008, now Pat. No. 8,552,855.

(60) Provisional application No. 61/024,736, filed on Jan. 30, 2008, provisional application No. 60/985,846, filed on Nov. 6, 2007.

(51) Int. Cl.
*G06Q 50/26* (2012.01)
*H04L 29/06* (2006.01)
*H04W 4/02* (2009.01)
*H04L 29/08* (2006.01)
*G06Q 10/10* (2012.01)
*H04M 11/06* (2006.01)

(52) U.S. Cl.
CPC .......... *G06Q 50/265* (2013.01); *G06Q 10/1095* (2013.01); *H04L 63/08* (2013.01); *H04L 67/18* (2013.01); *H04L 67/22* (2013.01); *H04W 4/02* (2013.01); *H04W 4/028* (2013.01); *H04M 11/06* (2013.01)

(58) Field of Classification Search
None
See application file for complete search history.

(56) References Cited

U.S. PATENT DOCUMENTS

| | | | |
|---|---|---|---|
| 5,742,509 | A | 4/1998 | Goldberg et al. |
| 6,044,368 | A | 3/2000 | Powers |
| 6,219,793 | B1 | 4/2001 | Li et al. |
| 6,266,396 | B1 | 7/2001 | Johnson |

(Continued)

FOREIGN PATENT DOCUMENTS

WO    2009061936 A1    5/2009

OTHER PUBLICATIONS

MobileKids. Mobile Phone Application. Owner: Bipper, Obtained Oct. 28, 2013. 4 pages.

(Continued)

*Primary Examiner* — Brian Zimmerman
*Assistant Examiner* — Sara Samson
(74) *Attorney, Agent, or Firm* — Santangelo Law Offices, P.C.

(57) ABSTRACT

Embodiments of the present invention may include systems and methods for monitoring a person's activities. A system may receive an input and may contact a designated party to ensure they are safe or perhaps even confirm they are at a specified location at a specified time. A system may also provide an escalation response in those circumstances where a primary contact is not reached or perhaps where it is directed by a primary contact. Further, a system may provide communications to a primary contact or a user including a plausible excuse for the primary contact to leave an agenda location.

16 Claims, 22 Drawing Sheets

(56) References Cited

U.S. PATENT DOCUMENTS

| | | | |
|---|---|---|---|
| 6,463,462 | B1 | 10/2002 | Smith et al. |
| 6,484,033 | B2* | 11/2002 | Murray ............... H04M 3/432 455/456.3 |
| 6,560,456 | B1 | 5/2003 | Lohtia et al. |
| 6,968,294 | B2 | 11/2005 | Cutta et al. |
| 7,012,534 | B2 | 3/2006 | Chaco |
| 7,076,235 | B2 | 7/2006 | Esque et al. |
| 7,119,716 | B2 | 10/2006 | Horstemeyer |
| 7,224,956 | B1 | 5/2007 | O'Neil |
| 7,312,712 | B1 | 12/2007 | Worrall |
| 7,818,420 | B1 | 10/2010 | Taylor |
| 7,885,390 | B2 | 2/2011 | Chaudhuri |
| 8,275,352 | B2 | 9/2012 | Forstall et al. |
| 8,401,527 | B2* | 3/2013 | Weltlinger ....... H04M 1/72519 345/173 |
| 8,688,070 | B2 | 4/2014 | Forstall et al. |
| 8,768,294 | B2 | 7/2014 | Reitnour et al. |
| 8,862,092 | B2 | 10/2014 | Reitnour et al. |
| 9,014,661 | B2* | 4/2015 | deCharms ............ H04W 4/021 348/14.02 |
| 2002/0107927 | A1* | 8/2002 | Gallant ............. G08B 21/0423 709/206 |
| 2003/0091158 | A1 | 5/2003 | Puchek et al. |
| 2004/0220841 | A1 | 11/2004 | Fainweather |
| 2005/0266839 | A1 | 12/2005 | Paul et al. |
| 2006/0068753 | A1 | 3/2006 | Karpen |
| 2007/0153993 | A1 | 7/2007 | Cohen |
| 2008/0188198 | A1 | 8/2008 | Patel |
| 2010/0003945 | A1 | 1/2010 | Primo |
| 2010/0003954 | A1 | 1/2010 | Greene |
| 2010/0003958 | A1 | 1/2010 | Ray |
| 2010/0046721 | A1 | 2/2010 | Geldenbott |
| 2011/0117878 | A1* | 5/2011 | Barash ............... G08B 21/0211 455/404.2 |
| 2012/0246089 | A1* | 9/2012 | Sikes ............... H04M 1/72536 705/325 |
| 2013/0276124 | A1* | 10/2013 | Tahir ................ G06F 21/577 726/25 |
| 2014/0025724 | A1* | 1/2014 | Granger ........... G08B 21/0297 709/203 |
| 2014/0308915 | A1 | 10/2014 | Reitnour et al. |

OTHER PUBLICATIONS

Buddy Safe. Mobile Phone Application. www.atomsage.com/buddysafe. Atom Stage, LLC. Obtained Oct. 28, 2013. 1 page.
Date Tracker Alert. Mobile Phone Application. www.datetrackeralert.com. Date Tracker Alert, LLC. Obtained Oct. 28, 2013. 1 page.
EmergenSee. Mobile Phone Application. Reitnour Investments, EmergenSee, LLC. Obtained Oct. 28, 2013. 5 pages.
Fake Call & SMS. Mobile Phone Application. Owner: Abishkking. Obtained Oct. 28, 2013. 2 pages.
GuardSnap. Mobile Phone Application. www.guardsnap.com. AppSnap, LLC. Obtained Oct. 28, 2013. 1 page.
Guardly. Mobile Phone Application. www.guardly.com. Owner: Vonschnauzer. Obtained Oct. 28, 2013. 3 pages.
I am Safe. Mobile Phone Application. www.iamsafe-mobile.com Owner: Xpertise Mobile. Obtained Oct. 28, 2013. 1 page.
I'm Safe. Mobile Phone Application. I'm Safe, Ltd. Sep. 25, 2012. Obtained Oct. 28, 2013. 2 pages.
Life360. Mobile Phone Application. www.life360.com. Owner: Life 360. Obtained Oct. 28, 2013. 1 page.
Fake Call by Magic Tap. Mobile Phone Application. Obtained Oct. 28, 2013. 1 page.
MyForce Personal Safety App. Mobile Phone Application. Soteria Systems, LLC. Obtained Oct. 28, 2013. 3 pages.
OnWatch. Mobile Phone Application. www.onwatchoncampus.com. Obtained Oct. 28, 2013. 1 page.
PanikApp. Mobile Phone Application. www.panikapp.com. Obtained Oct. 28, 2013. 1 page.
SafeMe. Mobile Phone Application. Elliot Bay Company, LLC. Obtained Oct. 28, 2013. 1 page.
Safety First Alert. www.mtu.edu/safetyfirstalert. Michigan Tech University. Obtained Oct. 28, 2013. 1 page.
StaySafe Business. Mobile Phone Application. www.staysafeapp.com. Safe Apps. Ltd. Obtained Oct. 28, 2013. 1 page.
Hollaback! Mobile Phone/web Application. http://www.ihollaback.org. Jan. 2011. Captured Mar. 19, 2015. 4 pages.
Working Alone. Mobile Phone Application. By Iain Munro. Updated Feb. 11, 2012. Captured Mar. 19, 2015. 2 pages.
Be Safe. Mobile Phone Application. By Jonathan Gross. Oct. 18, 2012. Captured Mar. 19, 2015. 2 pages.
iCare. Mobile Phone Application. www.sensortower.com by Enpronomics Solutions. Last updated Sep. 12, 2013. Captured Mar. 19, 2015. 2 pages.
ShakeSOS. Mobile Phone Application. Owned by AppPiper. Aug. 31, 2013. Captured Mar. 19, 2015. 4 pages.
Hurricane App. Mobile Phone Application by the American Red Cross. www.redcross.org/mobile-apps/hurricane-app. Updated Oct. 13, 2014. Captured Mar. 19, 2015. 2 pages.
Fake-Call Me Pro—Xmas Santa. Mobile Phone Application. Mobile App Builder. Dec. 24, 2014. Captured Mar. 19, 2015. 2 pages.
Fake-A-Call Free TM. Mobile Phone Application. By Excelltech Inc. Updated Jan. 31, 2013. Captured Mar. 19, 2015. 3 pages.
YWCA Safety Siren. Mobile Phone Application by YWCA Canada. Apr. 20, 2012. Captured Mar. 19, 2015. 3 pages.
Family Locator. Mobile Phone Application by Sygic. www.sygic.com/family-locator/features. Captured Mar. 19, 2015. 7 pages.
Gabe the Guardian; www.gabetheguard.com, captured Mar. 17, 2015, 1 page.
http://www.ruok.com; Are You OK? Telephone Reassurance Program; Taking the fear out of Being Alone; printed Nov. 4, 2008.
http://www.ruok.com/htdocs/WhatIsRUOK.php; Are You OK? Telephone Reassurance Program; Are You OK? What It Is and How It Works; printed Nov. 4, 2008.
http://www.callingcare.com; Database Systems Corp. CARE Call Reassurance; Senior Care Calling Program; 4 pages; printed Oct. 16, 2008.
http://web.archive.org/web/20060713155049/http://www.callingcare.com; CARE (Call Reassurance) Systems; 3 pages; printed Oct. 16, 2008.
http://www.medication-reminders.com; Database Systems Corp. CARE Call Reassurance; Medication Reminder Service; 2 pgs; printed Oct. 16, 2008.
http://www.call-reassurance.com; Database Systems Corp. CARE Call Reassurance; Senior Citizen Calling Service; 3 pages; printed Oct. 16, 2008.
http://www.latchkey-kids.com; Database Systems Corp. CARE Call Reassurance; Latchkey Kids Calling Program; 2 pages; printed Oct. 16, 2008.
http://www.safecheckin.com/safecheckin/index.php; Safe CheckIn Welcome; 2 pages; printed Oct. 16, 2008.
International Application No. PCT/US08/82661; International Search Report dated Feb. 23, 2009.
International Application No. PCT/US08/82661; Written Opinion of International Searching Authority dated Feb. 23, 2009.
U.S. Appl. No. 60/985,846, filed Nov. 6, 2007.
U.S. Appl. No. 61/024,736, filed Jan. 30, 2008.
U.S. Appl. No. 12/714,817, Notice of Allowance dated Jun. 10, 2013.
Brian Osborne Nov. 6, 2008, New iPhone app simulates fake calls | Mobile | Geek.com.
www.magictap.net/fakecalls.
Parent U.S. Appl. No. 12/741,817.
U.S. Appl. No. 14/315,567, Office Action dated Dec. 30, 2015, 44 pages.
U.S. Appl. No. 14/992,822, filed Jan. 11, 2016, First Named Inventor: Lisa A. Herickhoff, Office Action dated May 6, 2016. 12 pages.

* cited by examiner

KIDZcheckIN™
.com

Create/Edit Appointment
From this screen you can...

| Event | Safety net | Recurrence |

Appointment title: [_____]
Appointment date/time: [Mon 6/30/08] [____]
Applies to:  ☐ Mark   ☐ Ryan ( SAVE )

Event Tab (alternative fields)

| Date (person) | Event | Date buzz |
|---|---|---|
| Name<br>Phone<br>e-mail<br>Physical address<br>Dating site<br>his profile name | Location<br>Start-time<br>End-time<br>HOMEsafe time | Excuse time<br>Excuse<br>contact method |

KIDZcheckIN.com

Create/Edit Appointment
From this screen you can...

508

| Event | Safety Net | Recurrence |

1. Elaine :: Mother
   contact method: 970-227-XXXX

Actions
   Remove Elaine

2. Jim: Friend
   contact method: 970-227-xxxx

Actions
   Remove Jim

3. Shannon:: Friend
   contact method: 970-227-xxxx

Actions
   Remove Shannon

Add Safety Net
Choose one...

Contact Type
Choose one...

SAVE

KIDZcheckIN.com

Create/Edit Appointment
From this screen you can...

509

| Event | safety net | Recurrence |

Recurrence

Appointment time: _____

Recurrence Pattern:
○ Daily
○ Weekly
○ Monthly

Recur every ___ week(s) on:
☐ Sun ☐ Mon ☐ Tue ☐ Wed
☐ Thur ☐ Fri ☐ Sat  Sun

Recurrence Start: _____

Recurrence end:
○ No End Date
○ End After: _____ occurances
○ End By: _____

SAVE

FIG 5D

DATE 411: ↓⁵⁰¹

Date of function

Location of function [⇩]   Link to location web site [    ]

Start Time [⇩]   Buzz time [⇩]   Buzz contact pref [⇩]

End Time [⇩]   Home time [⇩]

Date's stuff: ↓⁵⁰²

Dating Web site [⇩]

Link to date's profile [    ]

Date's name [    ]

Date's phone (cell) [    ]

Date's phone (other) [    ]

e-mail [    ]

physical address [    ]

Background Check info: ↓⁵⁰³

Upload from previous check: [⇩]

Perform Background check [    ] ↓⁵⁰⁴

Event Confirmation: ↓⁵⁰⁵

Confirm the event [    ] hours prior with both my date and me.

FIG. 5E

SAFETY MONITORING METHOD AND SYSTEM

CROSS-REFERENCE TO RELATED APPLICATIONS

This application is a continuation of U.S. application Ser. No. 12/741,817 filed May 6, 2010 which is the United States National Stage of International Application No. PCT/US08/82661, filed 6 Nov. 2008, which claims the benefit of and priority to U.S. Provisional Application No. 60/985,846 filed Nov. 6, 2007 and U.S. Provisional Application No. 61/024,736, filed Jan. 30, 2008, each hereby incorporated by reference herein.

TECHNICAL FIELD

The invention provides enhanced system and methodology directed to the field of safety assurance by a voluntary recording and monitoring arrangement, assessing departure, movement and return of registered users or their designees. Generally this invention provides a system and method to respond to user requests in a multimedia manner, with maximum flexibility, astuteness and minimum fallibility. And, this invention also provides a method to catalog safety-related information. Specifically this invention relates to a method and system of chronologically-mediated responses from a set of requests input by a user to assess the safety, security, locale and well-being of said user during various events, executed via a multitude of communication devices and computerized modes utilizing minimal to no human interface.

BACKGROUND OF THE INVENTION

Safe return of people to their home following such interactions as dating, meeting friends, attending a meeting, outdoor events, and the like, is not a foregone conclusion. As but one example, on multiple dating websites the aspect that a method for increasing the safety of a person participating in such events is to share the event information and expected return time with a person who may then follow-up to make sure one returns. This places an undue burden on the recipient of the information and also relies on memory skills which can be fallible. Should something negative occur to the participant in the activity and the person charged with recollection forget pertinent information, or incorrectly recall the details, response of emergency personnel could be delayed. Avoiding such delay could be a critical in a successful response. In addition, many people wish to maintain confidentiality with regard to their social lives. The need to tell someone the details of their social life in order to maintain safety breaches confidentiality.

Further, assuring the arrival of people hired to perform work at a remote location, ensuring that children arrive home at the expected time, monitoring the necessarily regimented arrival of care-givers, assessing the residence duration of unmonitored workers, and the like, places a significant burden on already stressed individuals and provides a significant distraction to other tasks. As but one example, proper care and feeding of a pet when the owners are away from home for an extended period of time is imperative. However, it is difficult, and burdensome to call the care-taker each period they are supposed to arrive. Further, even if the care-taker is called, they could present false information about their location. The well-being of the animal is at stake should the care-taker fail to perform expected duties. As a second example, the prompt arrival of children home from school or other activities is of constant concern yet a parent who is otherwise occupied cannot always call the child, nor receive calls, to confirm their arrival. As in the previous example and this example, unwittingly delaying the knowledge of missed arrivals could have dire consequences.

Existing solutions to the problems are inadequate. For example U.S. Pat. No. 6,044,368 may provide a method and apparatus for managing and/or coordinating commitments in such a manner that an agent is notified of a requested response and once the agent responds the action is entered in the database. While in a general manner, this invention may include a response generated as a result of a computerized input request, a response by the system may not be adequate and the system and method may require human (agent) interaction. U.S. Pat. No. 6,560,456 may provide technology that may allow a subscriber to remotely trigger via dialed digits, receipt of a specified or selected text message (short message service or SMS). It, however, may not provide the computer solution of the present invention.

Similarly, U.S. Pat. No. 6,463,462 may teach a method and system for delivering and responding to messages to and from a variety of electronic sources in a device independent manner, as well as automatically security processing and organizing message responses. As before, this is not, in and of itself a complete solution to the problem involved.

U.S. Pat. No. 7,119,716 may teach a response system and method however, among other aspects, it is not driven by user's desire to be contacted, it does not allow for a cascade of events based on user's response and it does not allow for multiple contact requests to be input at one time.

Other existing systems may require the use of specialized devices to monitor care-takers and their charges. U.S. Pat. No. 6,968,294 may provide a method for monitoring the presence of a person based on visual or verbal recognition which, if recognition is not obtained, triggers an alarm. This type of device may require specialized equipment for recognition and may require prior input to enable recognition. Further the system may function to trigger an alarm if an incidence occurs. U.S. Pat. No. 7,012,534 may provide a system and method for monitoring infants and caretakers by utilizing a system of electronic badges and monitoring device. For the intended broad-based applications, the need for specialized devices is not practical, nor economically efficacious.

There are two computer based so called "reassurance programs" that may perform limited functionalities of assurance monitoring. These include Calling Care by Database Systems Corp. (www.callingcare.com) and Are You OK? by Northland Innovations (www.ruok.com). Both of these systems may require the purchase of a full computer system and the use may be limited to people in communities where the government agencies see fit to purchase such a system. Moreover, the systems may be constrained by the number of calls out of the system at any one time. Because they may require the purchase of hardware and software, it may not be readily available to the general populous, use may be constrained by the local agencies self-imposed limitations, and it may be too expensive to purchase for a small group, small family, or single person. There are also a number of limitations in functionality including, but not limited to, no use of short message service (SMS or text messaging), no use of recognition devices to verify identity of user, lack of coordination with currently available technologies, including mobile web devices and the like, requirement of human-manned calling centers, escalation of security issues may not be driven by the user, but rather may be constrained by a system and they may not coordinate with existing security measures.

DISCLOSURE OF THE INVENTION

Accordingly, the invention provides various embodiments that can be implemented either alone or in combinations to achieve a variety of goals. Some of these goals include, but are not limited to, providing a web-based process of personal safety monitoring which may store disparate items perhaps relating to interpersonal interactions in one discrete location, may assist in the safe, discrete departure of an individual during interpersonal relations, may be discrete and simple enough to use in public, can assess the accuracy of information related to individual safety and security, can monitor the well-being, safety and security of people residing alone, even if only for a period of time, can utilize current technology, and may even provide a communication system for the initiation of an escalation response in the case of potential trouble. Further goals may include a method and system that can assess arrival at a safe haven (such as home), and can shorten the elapsed period of awareness should a person not arrive as expected. In addition, embodiments of the system may provide these services without the purchase of additional hardware or software, utilizing technologies currently enabled by the user, and perhaps even with the flexibility to provide a full range of services, regardless of the technological devices owned.

As to the goals of this invention, it may be understood that social situations can be challenging and at times, dangerous. One of the biggest hurdles in providing assistance to people in dangerous situations may be a temporal delay in the knowledge they are missing. This may be especially true for people that live alone or who are alone for periods of time. Examples of such include, but are not limited to, single adults living with or without a roommate, children returning to an empty home, and the like. A delay can be further exacerbated by a lack of knowledge with respect to the location of an event being attended, the person or people with whom the person may be interacting or even an expected arrival time. Further knowledge or in some cases, more intimate knowledge, of the person or people with whom the person is interacting, such as their phone number, e-mail, and the like, could help emergency personnel in their duties. As to the general goals, this system may provide a solution to such potential delays and to provide a level of security to the user.

Moreover, a delay could be minimized by another group of goals that strive to provide a repository for information relating specifically to a user, a user's charges, a user's network of responders, and perhaps even a user's social network. It may be understood that this information is currently difficult, if not impossible, to track down in a timely manner. In the instance of a person online dating, this information could include links to the profile of their date(s), name, and known contact information. This information could also include information obtained via background checks generated by the system prior to a social interaction. In the instance of a child, it could include current height, weight, school, a recent photograph, and the like.

One goal may be to provide security by assessing the return to a safe haven after an outing, without necessitating the corroboration of other people. Confidentiality and safety are generally at odds with one another in this scenario. Moreover, the scattered nature of families, both nuclear and extended, may create many situations where people live in an area without having someone in their vicinity to check on them or even their charges. Moreover, people are generally somewhat reclusive and private, not wanting to be 'required' to report their actives, even if this is a breach to their safety. A general goal of this system may be to provide a virtual monitoring system that may serve the function of a friend, or neighbor in providing general oversight, but perhaps allowing a person to maintain their privacy and confidentiality unless a safety breach necessitates potential intervention and may be absolutely required. Such a goal may include assuring the identity of the individual via a variety of means including biometric and utilizing already owned devices as a means to avoid malicious 'fooling' of the system.

In order to further facilitate the goal of confidentiality coupled with timely response, the system can utilize a variety of methods and manners to attempt to alert or even contact an individual in order to avoid false escalation of a situation. Such contact methods as well as escalation responses, response times, and the like may be customized by the user.

Another goal may be to provide the aforementioned functionalities in such a manner that use may be discrete and may not be readily detectable. In addition, such goals may include a method of asking for and receiving help in a discrete manner. Alerting a potentially dangerous person to one's fear can exacerbate a situation, and/or insight a greater degree of danger. Providing a method to exit such situations that is 'non-alerting' could provide a measure of safety. And, providing a method to alert friends or family as to a need for help coupled with the user's location could expedite a response, and could help to avert danger.

Another goal may be to provide a verified notification system. Often contact information such as phone numbers, and similar contact methods, may be incorrectly conveyed, lost or mistakenly transcribed. A goal of the system may be to record such information then assess the accuracy prior to a required use. A related goal may be to notify the user's network of their responsibility, the possibilities and perhaps even to assess the willingness to assist the user as well as to verify their contact information. An ancillary goal may be to provide a user network or safety net should a user fail to have a local group of people upon whom one can rely.

Sharing of information may provide a similar measure of security but may be subject to the fallibility of the receiving party. A goal of this system may not be to simply retain information but to verify such information in a timely manner, prior to a situation which necessitates use. Note, the goal of this system may not be to provide an emergency response method or system but rather to provide a self-selected measure of security.

Another goal of the system may be to assess the arrival and departure of designees of the user in a respectful, discrete and remote manner, such that the user may not be required to actively participate thereby enabling discrete use of the system.

Another goal of this system may be to ensure, when warranted, that a person is physically following up on the safety and well-being of the subscriber, or subscriber's charge. In this way the subscriber or charge may be assured that not only has someone been notified of their potential plight, but also are willing and able to accept such responsibility.

BRIEF DESCRIPTION OF THE DRAWINGS

FIGS. 5A, 5B, 5C, 5D, and 5E show examples of screen displays a user may populates to store information about a social interaction in accordance with embodiments of the present invention.

MODE(S) FOR CARRYING OUT THE INVENTION

Figure 1:
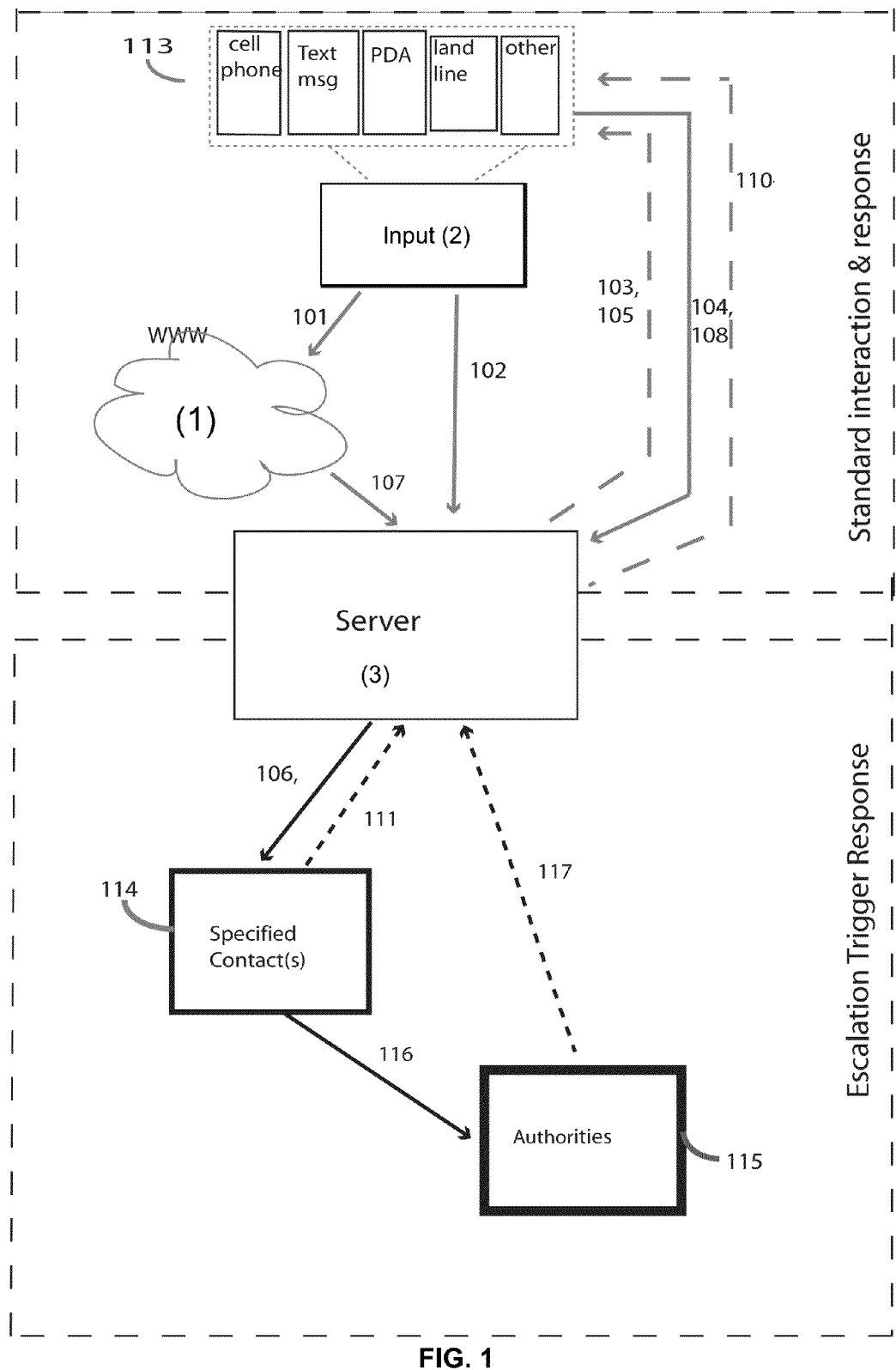
FIG. 1 is an overview of an example of a monitoring system in accordance with embodiments of the present invention.

The present invention includes a variety of aspects, which may be combined in different ways. The following descriptions are provided to list functions and elements, and to describe some of the embodiments of the present invention. Elements are listed with initial embodiments, however it should be understood that they may be combined in any manner and in any number to create additional embodiments. The variously described examples and preferred embodiments should not be construed to limit the present invention to only the explicitly described systems, techniques and applications. Further, this description should be understood to support and encompass descriptions and claims of all the various embodiments, systems, techniques, methods, devices and applications with any number of the disclosed elements, with each element alone, and also with any and all various permutations and combinations of all elements in this or any subsequent application.

In general, the invention may include methods for individually devised personal safety and security systems. Some systems may include, but are not limited to, systems which can provide interactive communication, on-demand communication systems, information management and storage systems, safety and security verification systems, identity verification systems, escalation systems, response systems, and the like. It is noted that while specific examples discussed in this application may relate to social interactions such as dating, monitoring of children, or the like, the various embodiments herein can be applied to other applications such as senior citizens, children, employees, contractors, caretakers, home service providers, pet sitters, child-care providers, estranged spouses, people on business trips, people involved in recreational activities, infirmed individuals, single people, rescue activities; government agencies tracking people involved in foster care, social services, social workers, parole activities, and the like and all are meant to be included in this disclosure.

Embodiments of the present invention may include a method of monitoring user activities comprising receiving an input from a communication device of user schedule information having at least one agenda time, primary contact data, and specified contact data; automatically storing the user schedule information in a computer storage memory component of a computer; registering a contact communication by the agenda time; automatically confirming the contact communication with a system compliant communication requirement; and even providing an escalation response for a non-compliant contact communication. Other embodiments may include a user monitoring system comprising a user information memory configured to accept and store user schedule information having at least one agenda time, primary contact data, and specified contact data; a contact communication schedule responsive to the user schedule information; a contact communication entry; an automated verification comparator responsive to the contact communication entry configured to determine if the contact communication entry complies with a system compliant communication requirement; and perhaps even a hierarchical escalation response element responsive to the contact communication entry and the automated verification comparator.

Referring to FIG. 1, a functionality can be further understood via a simplified schematic. In this figure, it can be seen that a server (3) can accept an input (107 or 102) via the world wide web (1) from a registered user (2). In this embodiment, the user (2) may manually enter information, perhaps even user schedule information, via a communication device (113) such as but not limited to a keyboard, linking to world wide web (WWW) websites, linking with other technological devices, a computer, internet transmission source, email transmission source, phone, a cellular phone, a text message, a voice message, a PDA, a landline, or the like. In this embodiment, the user may be linking information from disparate websites to the users' specific location on this site. A link and information transfer may also be established by utilizing data stored in personal devices such as a PDA, cell phone, electronic calendar or contact management system or the like. For example, a dating schedule already input in an outlook calendar may be automatically captured via a synchronization, or network connection device, or via simple download. Other information such as phone numbers and the like may be transferred, even a single input such as one phone number.

Regardless of method of input, this information transfer may allow a user to input user schedule information including but not limited to primary contact data including their contact numbers and preferred methods of contact, specified contact data, information about their safety network or secondary contact(s) (114), information about social events, at least one agenda time they wish to be contacted, agenda address, primary contact home address, addresses, third party data, escalation response preferences, and the like. Primary contact data may include but is not limited to, communication device data, a phone number, an email address, a text message address, a cell phone number, a home phone number, user contact data, non-user contact data, a child's contact data and the like. A primary contact may include but is not limited to a child, a parent, a person, an elderly person, a single person, caregiver, pet sitter, service person, disabled person, infirmed person, a user, non-user, and the like. Further, specified contact data may include but is not limited to communication device data, a phone number, an email address, a text message address, a cell phone number, a home phone number, user contact data, third party contact data, non-user contact data, alternative contact data, and the like. In addition, the ability to change the order of or remove at will a specified contact may be included in the system. A system may automatically calendar an agenda time so that it can keep track of when the next contact should occur. An agenda time may include but is not limited to an arrival time, a departure time, a check in time, and check out time, reoccurring event data, and the like. This may be done through a computer system, processor system, microprocessor system or the like. At the specified time, the server may automatically contact (103) a primary contact via the appropriate (pre-specified) communication device (113). Contact methods may include but are not limited to sending an email, sending a text message, making a phone call, contacting a home security system, and the like. The user may then send a subsequent contact communication such as but not limited to a request for a second call (104) back at the time the user or primary contact is expected home, which may then prompt the server to contact the user or primary contact (105) a second time. If the call is not answered, the server may continue to call back (110) at pre-specified intervals.

In other embodiments, a server may register a contact communication by an agenda time. A contact communication may include any one of the following, but is not limited to, a no-response contact communication; a phone call answer; a dialed digital response; a numeric response; a home security communication; a dialed "1"; a voice communication; a Global Positioning System data; a security code; a dialed security code; a voiced security code; a biometric identification; a text message; a phone call; an email; a check out communication; a check in communication; a digital photograph; a request for escalation, and the like. A contact communication may include communications or lack of communications from a user or primary contact by an agenda time or may even include communications made by a system to a user or primary contact. A system may automatically confirm a contact communication with a system compliant communication requirement. System compliant communication requirements may include, but are not limited to, requirements to confirm that a user has actively answered a phone call as compared to perhaps an answering machine response; a predetermined user check in or even check out time; a specific communication device identification data such as a phone number via caller identification, a user profile, an email address, or the like; a security feature requirement to confirm a contact's identity; and the like requirements. As such, a system may confirm compliance of a contact communication with a system compliant communication requirement. If it is determined that the contact communication is non-compliant, in response, a system may provide an escalation response or even a hierarchical escalation response. Non-limiting examples of an escalation response may include contacting a primary communication device associated with a primary contact using primary contact data; contacting a specified communication device associated with a specified contact using specified contact data; contacting via alternative means; waiting a predetermined amount of time and contacting a primary communication device associated with a primary contact using primary contact data; fining a primary contact for a non-compliant contact communication; contacting an alternative communication device; contacting an emergency service communication device associated with emergency services; and the like. Further embodiments of escalation responses are discussed herein.

In other embodiments, if a user or primary contact does not respond to a request for response by the server via any of the methods of the user input, then the server may contact (106) the user's safety network or specified contact(s) (114) and ask them to take responsibility for the monitoring of the user or primary contact. A safety network or specified contact may be comprised of any number of people (friends, family, neighbors, security firm) and an escalation to the safety net may elicit a sequential perhaps hierarchical contact event until one member of the safety network is perhaps a) contacted physically, or returns a message in a prompt manner; and b) will accept responsibility (111). The system may perhaps share the last known location of a primary contact with an authorized safety network person who has accepted responsibility (111). The safety network or specified contact can then contact (116) the appropriate authorities (115), if warranted. Further, should it be necessary, the authorities can contact the server (117) or the safety network specified contact to obtain information on the whereabouts of the primary contact, the person with whom the user was last meeting, the identifying information of the individual, and the like information.

Figure 2:
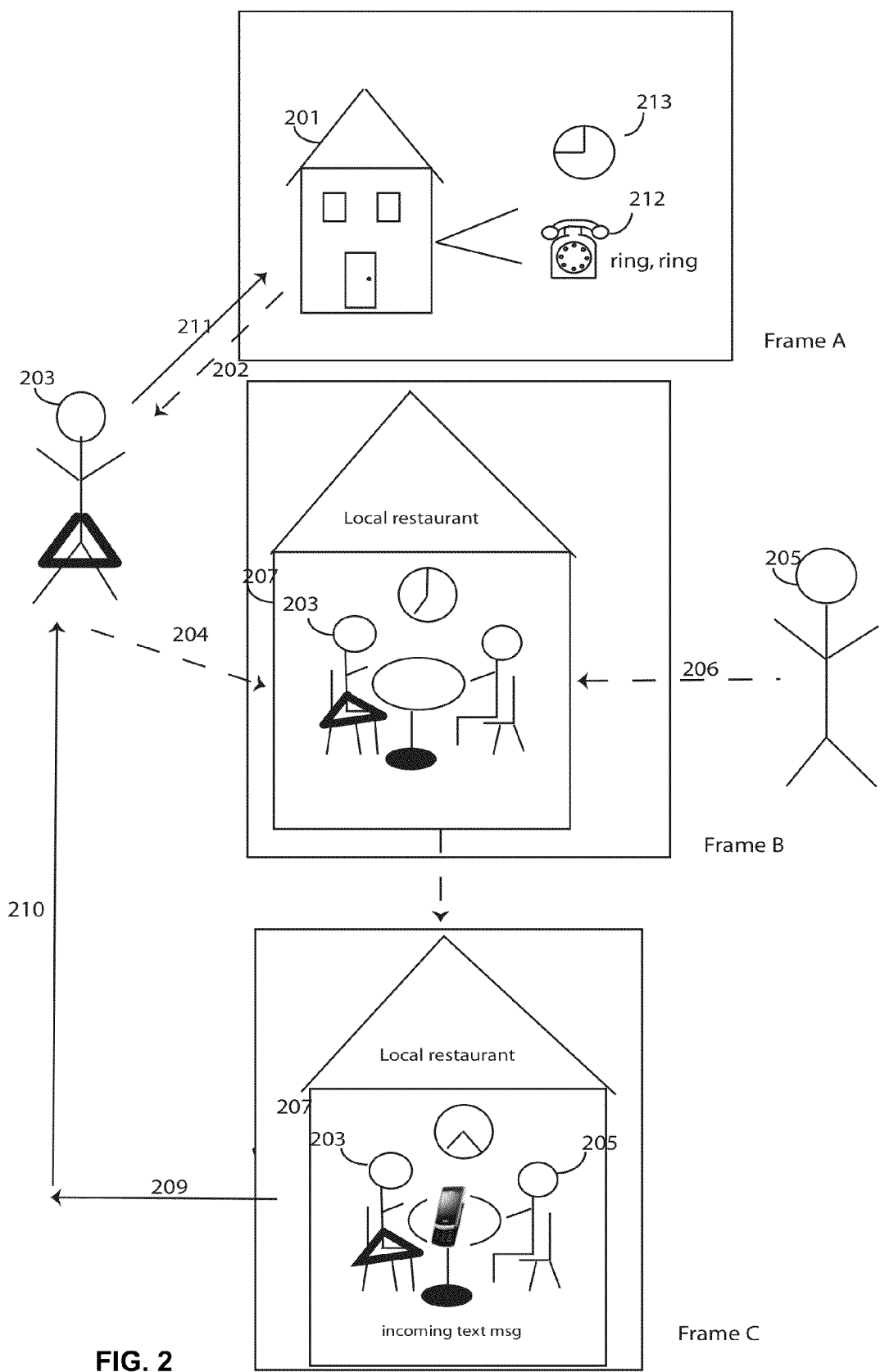
FIG. 2 is an overview of a second example of a monitoring system in accordance with embodiments of the present invention.

FIG. 2 is a simplified schematic representation of the functionality of one embodiment of the present invention. A registered user or even primary contact (203) of the system may depart (202) their residence (201) and arrive (204) at a meeting location for an interaction with another person or third party (205). The pending interaction between the two may have been logged into a web site, the background information on the third party (205) may have been verified, and perhaps even a confirmation of the event via a communication notice may have been sent to a third party prior to the meeting. A communication notice may include a reminder of an agenda time and even a schedule. Confirmations, responses, input, or even output can be exchanged via any variety of communication devices including, but not limited to, computer, internet transmission source, email transmission source, phone, cellular phone, land line phone, text messages, voice messages, phone integrated with a device, a phone integrated with a security system, a Personal Digital Assistant, personal communication devices, mobile web devices, world wide web, e-mail and the like. As such, they may both arrive (204, 206) at a local public meeting spot or location (207). A system may provide calculating an instruction communication to provide to a primary contact an excuse to leave an agenda location. A user or primary contact may take a digital photograph of a third party and may upload it to their calendar. At a predetermined time, perhaps selected by the user (203), an instruction communication such as a plausible excuse (again, perhaps selected by the user during a previous interaction with the server) may be communicated to the user (203) (see Frame C) perhaps directing a user to leave an agenda location, such that she may be able to leave the event in a graceful manner. Such communications might be conducted utilizing interactive voice response (IVR) such that it may be transparent to the other person that it may be a server-generated call. The communication manner (text message, cell phone call, e-mail or the like) may be pre-selected by the user. Further such communications can be voice driven, numerically driven, or any other type or combination of types of server-driven communications. Voice driven communications may be more natural and allow for a plausible, discrete interaction. In this instance, a type of biometric identification such as voice recognition, could be utilized to verify the identity of the user. Alternatively, a code of the user could be integrated into conversation such that it is not recognized by people who are in the vicinity of the call. For example a user may say, "yes, I will be at 63 Walnut street" where the user's identification code is the number 63. Utilization of such a code provides an embodiment to further increase safety and security by providing an impediment to a malicious person who might otherwise attempt to disable or override the system. The code, or rather an incorrect code, used consecutively, might also be utilized to trigger a call for assistance to the safety network.

In other embodiments, excuses to depart can also be generated real-time by utilizing a mobile communication device to contact the server and request an instant excuse. Such interactions can take place via the previously mentioned communication channels, and can include a pre-determined excuse message or a randomly chosen message if one has not been designated by the user in their profile. Such an excuse may provide a plausible, non-threatening and non-alarming manner for a user to leave a situation which may be potentially uncomfortable. Should the person, a third party (205), being met be a threatening (or seemingly so) type-person, this type of 'normal' interaction could serve to placate them, or at the least, to provide a window of opportunity for the user to safely depart (209, 210). In addition, a user can decide to leave the meeting location or perhaps even ignore the excuse communication and stay at the meeting location.

At the time (213) the user is expected to return home (211), the user's communication device (212) may receive information from the server asking if the user is a) home and/or b) safe. If the user has a home security system, a record of the egress and ingress of the user could be stored in the user's profile on the server. In addition, the user might choose to have ingress trigger a phone call from the system to verify that the user is indeed the one who entered the home and to verify that they are safe. Alternatively, a Global Positing System coordinate may be calculated based on user schedule information, for example an address. A system may receive information from a user or primary contact about their location and in embodiments, a system may track the contact location against the GPS coordinate. For example a GPS system in a cell phone may used to ascertain if a person in physically located in the expected location at an expected time. In an instance that the user is not home when expected, or is not safe, an escalation procedure may be followed.

It should be noted that each time communication is attempted with a user or primary contact, the identity of the user may be verified by a numeric code chosen by the user or any other method of discrete identification of an individual. A distinct primary contact security verification data may be identified by a user perhaps during a registration event. After a system may contact a primary contact and receive a contact communication from a primary contact, a system may automatically decide if the contact communication complies with distinct primary contact security verification data. As further explained, such distinct primary contact security verification data can be different for each specified primary contact. Distinct primary contact security verification data may include but is not limited to a name, an address, caller identification information, a security code, a digital security code, a digital photograph, an email address, a user name, a phone number, Global Positioning System information, biometric identification methods such as voice recognition and identification, retinal scan, finger print, facial scan, hand geometry biometrics, iris scan, signature, palm vein authentication, home security information, and the like. In yet another embodiment, interactive voice response (IVR) could be utilized such that verbal codes can be deciphered from a seemingly normal stream of conversation.

Regardless of outcome of any interaction, a record of any or all interactions, calculations, and perhaps even user schedule information can be stored in a computer storage memory component of a computer, for automatic retrieval such as for processing needs or perhaps even for the individual user's perusal, and/or for the use of the authorities in case of an emergency. As such, systems may provide a user retrieval element. Examples of retrieval of stored data may include but is not limited to schedule information, agenda time, primary contact data, distinct primary contact security verification data, data relating to said contact communication, data relating to said location characteristic, data relating to said system response determination, calculated location characteristic, data relating to third party information and the like.

Embodiments of the present invention may include a method of monitoring user activities comprising receiving an input from a communication device of user schedule information having an agenda time, primary contact data, and distinct primary contact security verification data; automatically storing the user schedule information in a computer storage memory component of a computer; automatically calendaring the agenda time associated with the user schedule information using a computer microprocessor; automatically retrieving the user schedule information at the agenda time; automatically contacting a primary contact using the primary contact data at the agenda time through a primary communication device associated with the primary contact; automatically providing multiple automated directional response options to the primary communication device at the agenda time; receiving a contact communication from the primary communication device associated with the primary contact; automatically making a system response determination based on the contact communication; automatically storing the contact communication from the primary communication device associated with the primary contact on the computer storage memory component of the computer; and perhaps even allowing user retrieval of the user schedule information, the contact communication, and the system response determination. Other embodiments may include a user monitoring system comprising a user information memory configured to accept and store user schedule information having an agenda time, primary contact data, and distinct primary contact security verification data; an electronic calendar element responsive to the user information memory and configured to lodge the agenda time associated with the primary contact data within the electronic calendar element; a third party interactive communication output responsive to the user information memory; an automated multiple directional response option generator responsive to the electronic calendar element; a primary contact communication input responsive to the third party interactive communication output; a hierarchical response element responsive to the primary contact communication input; a primary contact communication data store responsive to the primary contact communication input; and perhaps even a user retrieval element of the primary contact communication data store.

Figure 3A:
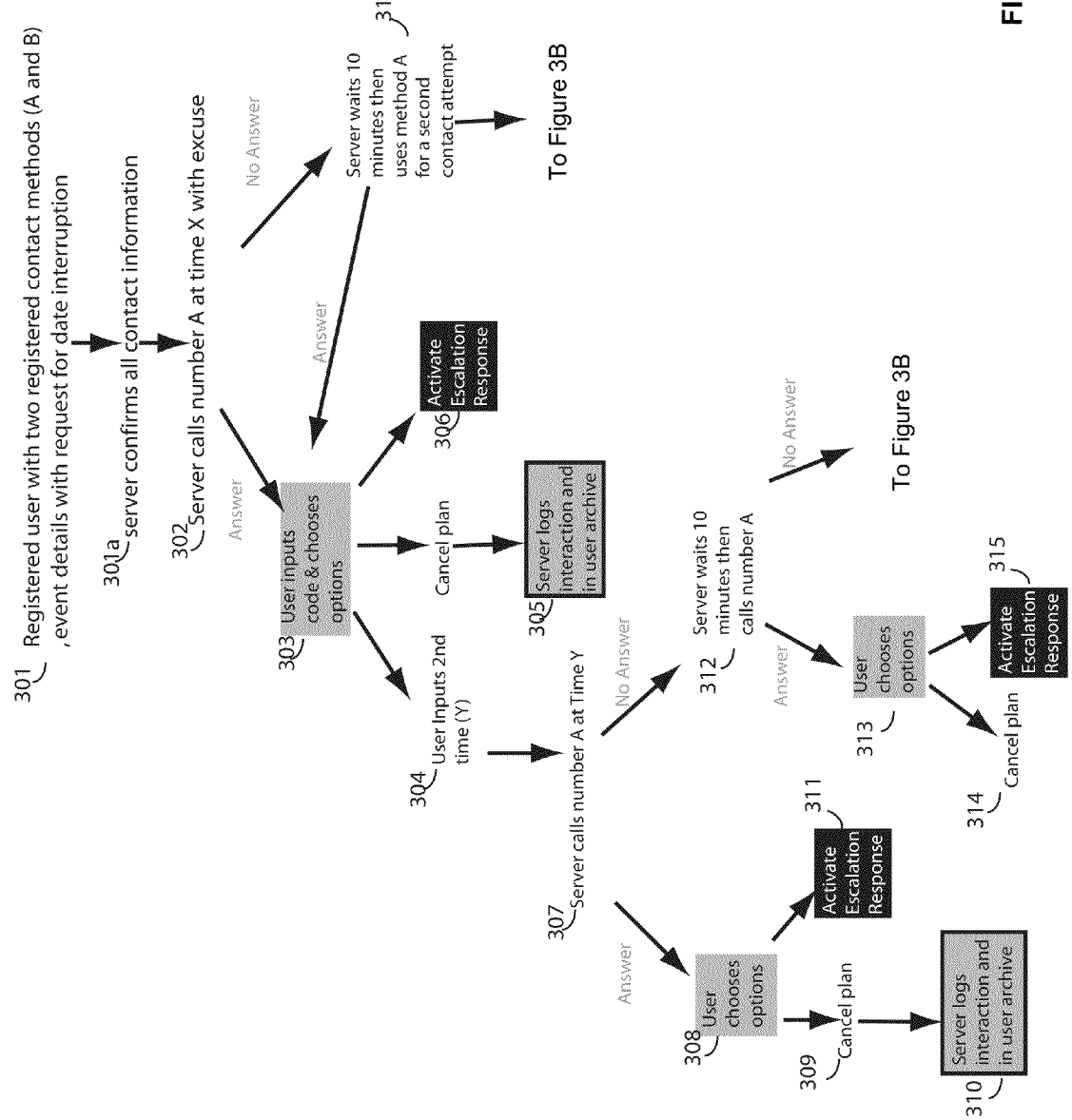
FIGS. 3A, 3B, 3C, 3D, 3E, and 3F details one embodiment of the present invention through a series of interconnected flow diagrams.
Figure 3B:
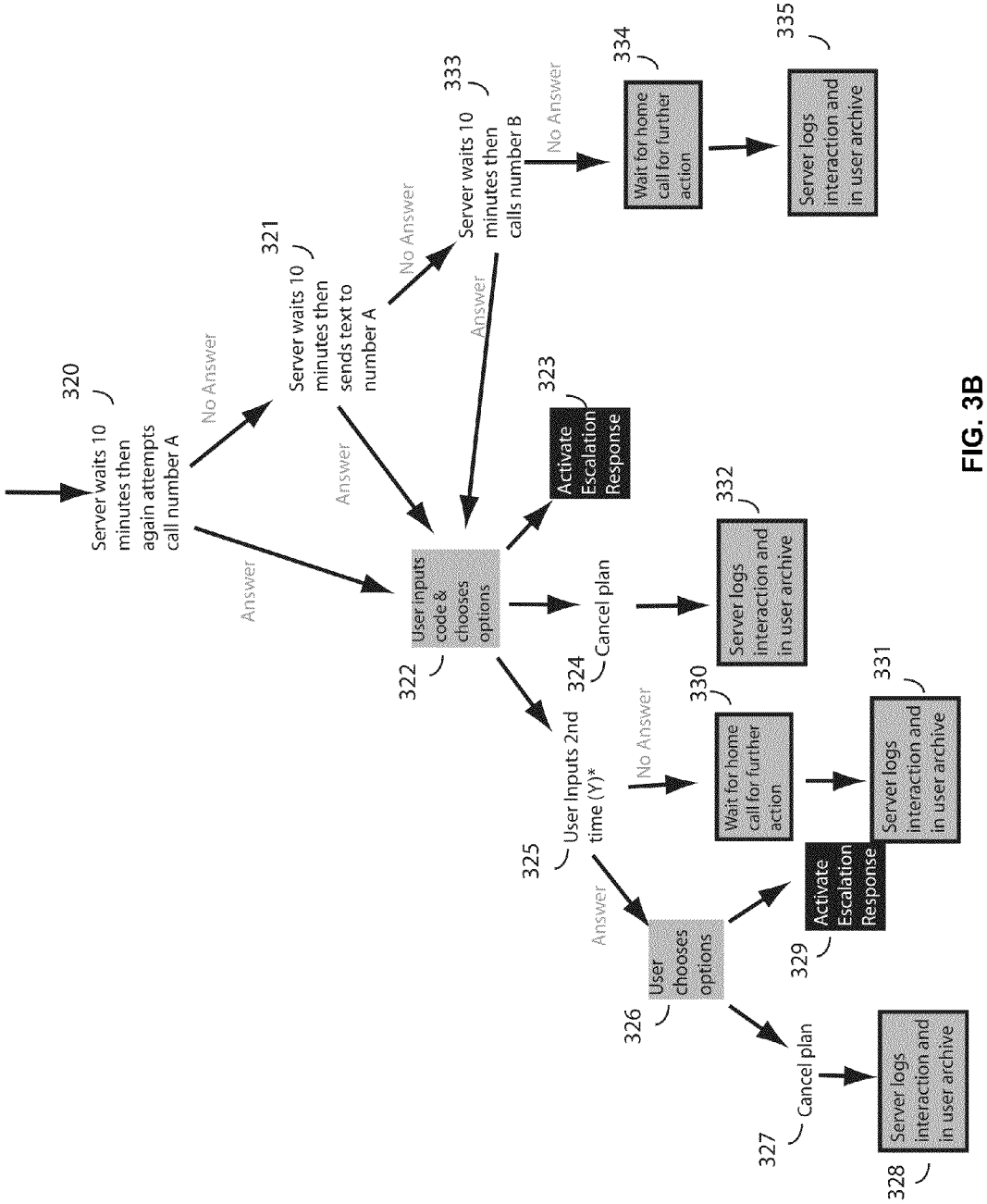
Figure 3C:
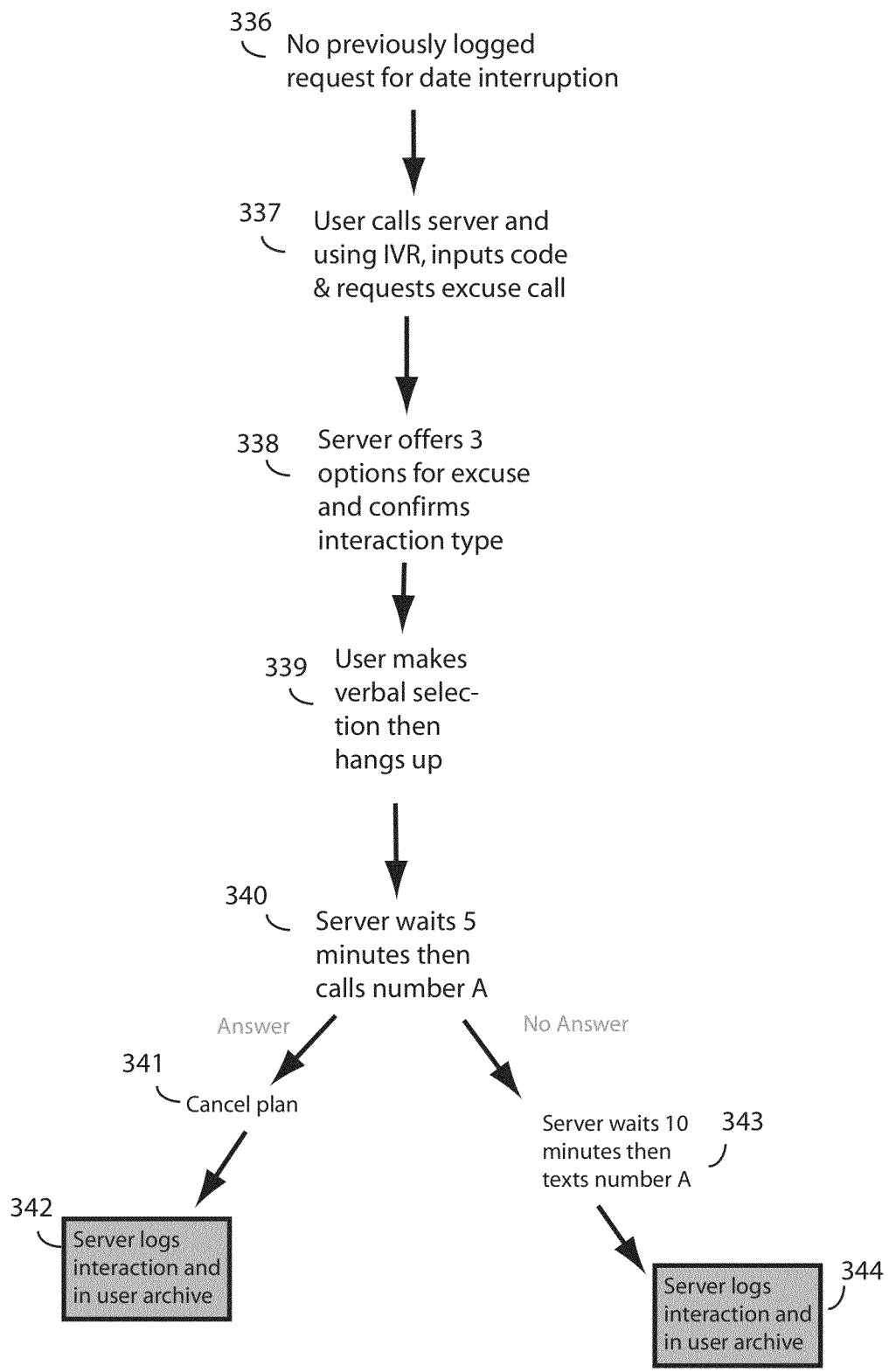

FIGS. 3A, 3B and 3C are a series of flow diagram of an example of one embodiment of the present invention as relating to the interactions illustrated in FIG. 2. In FIG. 3A, a user may register by inputting contact information, specified contacts or safety network data, preferred technological interactions, and the like (step 301). After registration, the server may verify accuracy of the contact information for the user (step 301*a*), plus the safety network, perhaps even simultaneously obtaining consent and informing the safety network about the system. Verification of contact data may be important to confirm that the supplied data can be used to contact the necessary person. For example, a system may make a test call to the supplied phone number to confirm that the primary contact phone number works. At this time, or at any future time, the user may log-in and register an event which may require them to leave a location and perhaps even return to home. In addition, the user may indicate they want the server to check on their security during their social outing. At a designated agenda time, the server may contact the user or primary contact and provide a plausible excuse (302). If a user responds to a communication, they may input their user code (or may be identified by some other means including biometric) any may choose from multiple automated directional response options (303). These options may include but are not limited to: (option 1) respond they are "OK" and do not want further contact until the next scheduled interaction to which plan may be cancelled and at which time the server logs the interaction (305); (option 2), indicate they are in an uncomfortable or unsafe situation and wish their secondary contacts to be notified, perhaps to activate an escalation response (306); or even (option 3) ask for a second call at a future agenda time (304). Option 3 may result in the repetition of the aforementioned options at a second time point (307-311).

More generally, in embodiments, a system may provide multiple automated directional response options when contacting a primary contact. Multiple automated directional response options may include but are not limited to providing a call back option; providing a text message back option; providing an email back option; providing at least one excuse to leave option; providing an automated system contact to a specified contact option; providing an option to enter a security code; providing an option to end supervision and the like options. A user may then select an option by sending at least one directional response to which a system may respond perhaps by re-contacting a primary contact, saving the at least one directional response to a computer storage memory component, contacting a specified communication device, sending an exit methodology to a primary contact, contacting an emergency service communication device, and the like.

FIG. 3B continues the scenario, describing how a system may respond to unacknowledged attempts at communication with the user or primary contact for an event interruption (318, 319). In each instance, if the communication is not answered, or the communication not acknowledged, a designated period of time may be allowed to elapse before the server may make another attempt at contact utilizing the first method (312, 320, 321). If still no answer, a system may utilize an alternative method (333), for example a text message to a cell phone number. If there is no response, and in as much as the user may have a home arrival time scheduled (334), the server may simply log the interaction (335). If contact is made during one of these attempts, the user may have the same options for response (313, 314, 315, 322, 323, 324) as previously described. If a second excuse call may be requested (325), the user then have two remaining options (326) upon execution of that contact (327, 329), and if the call is not answered, the server may wait (33) or perhaps even simply log the interaction (331).

Similarly, the user might not have previously requested an excuse call or date interruption call (336), but can request it on command by contacting the server such as perhaps by e-mail, text message, interactive voice response (IVR), and the like (337) as shown in FIG. 3C. When such a call may be logged (337), the server may provide a variety of options (338) and the user may chose one (339) then wait for the server to contact them (340). A user may answer the server contact and cancel the plan (341) and a system may log the interaction (342) and perhaps wait for the next scheduled contact. As a security measure, a user may input their user code when answering a server contact. If the call is not answered, the server may attempt one more interaction (343), then perhaps log the interaction (344) and wait for the next scheduled contact.

Figure 3D:
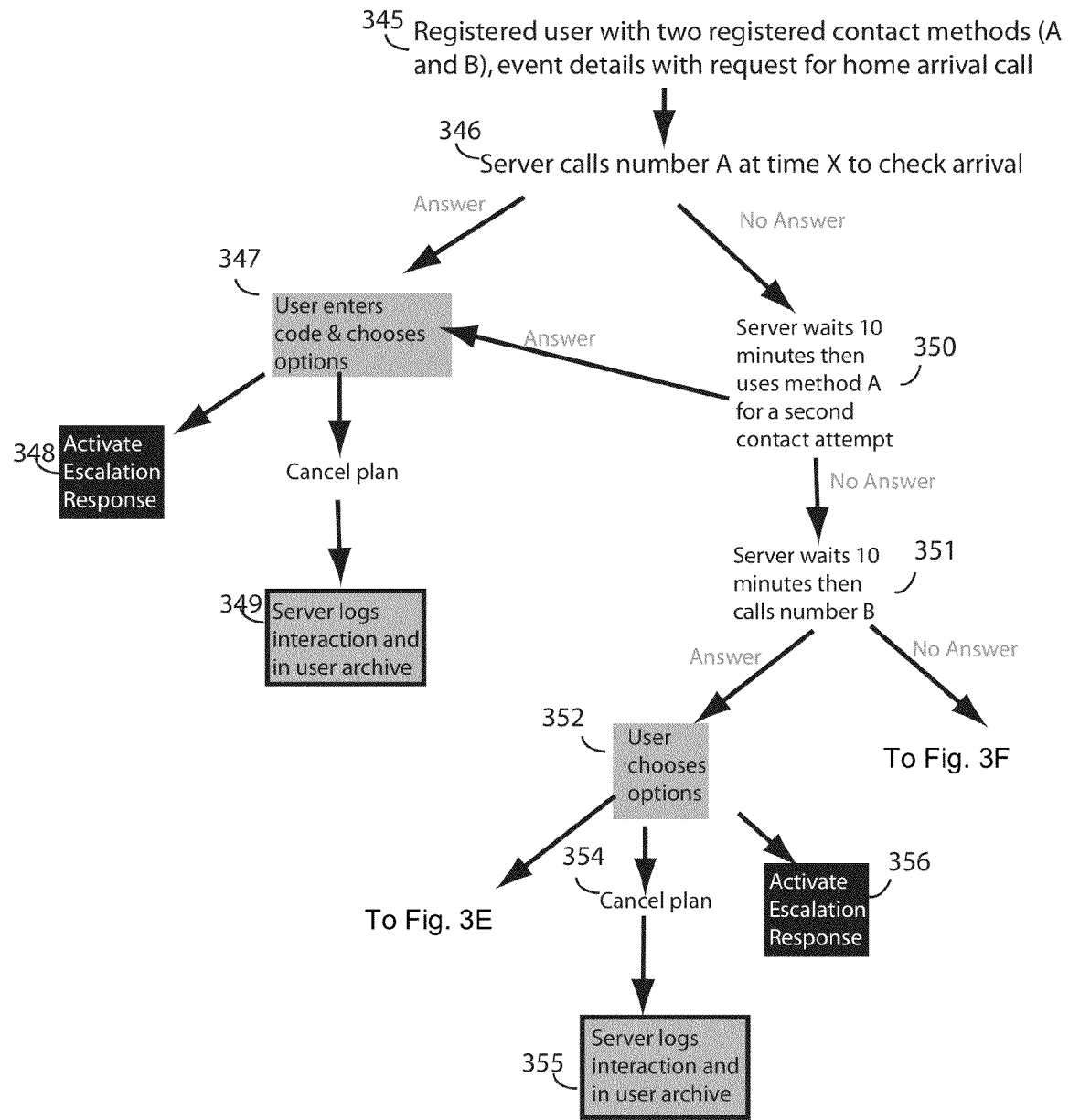

When a user or even a primary contact may be scheduled to arrive home, perhaps such schedule information previously registered (345) as shown in FIG. 3D, the server may contact the user or primary contact (346) through a communication device specified by the schedule information. A contact may be through a land-line phone such that location can be verified, however, the user may have full control over the selection of this and other or alternative contact methods. If the user answers the contact attempt, they may inputs their user code, and select the next option (347). A user may indicate they are home and safe and may even cancel further interactions based on this registration and the system may log the interaction (349). Optionally, a user may request an escalation response (348). Alternately, a system could be integrated with the home alarm system, and the opening of the door (or motion sensors triggering) followed by entering of a code on the alarm key pad could also be utilized to cancel further interactions for the registration (349).

Figure 3E:
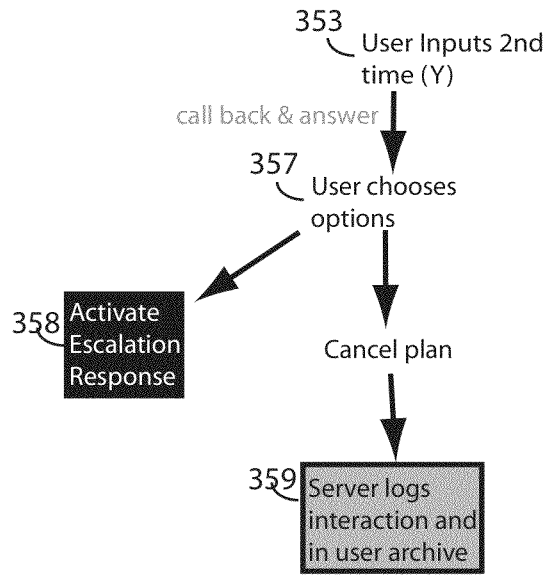
Figure 3F:
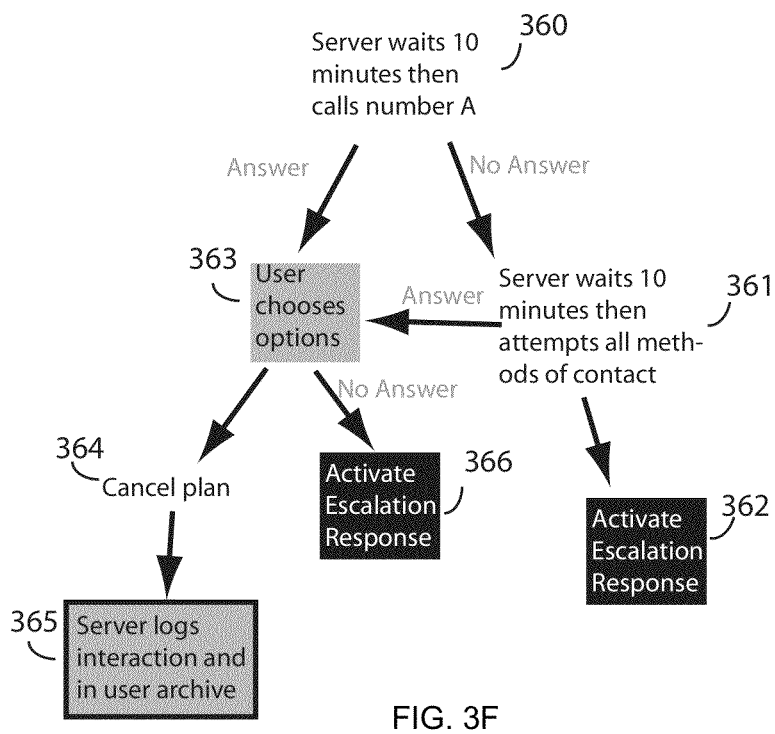

If the communication is not answered, the server may wait a pre-assigned or pre-selected period of time then attempt communication again (350). An answer will result in the aforementioned options (347-349), but an unanswered attempt, will result in attempt to an alternate number (351). At this point, if the user responds (352), the user has the standard options (354-356) and perhaps even an additional option of requesting a home check at a later time, followed by the standard protocol, see FIG. 3E (353-, 357-359). If a series of communication attempts go unanswered (350, 351, 360), the server might make a final attempt to rouse the user using all possible communication attempts (361) and if these go unanswered, the server may activate the escalation response (362). If the user responds to one or more of these communication attempts, they may have the option (363) of ceasing communications (364, 365) or activating the escalation response (366).

Note, all of these interactions between the server and the user or primary contact can be accomplished using any variety of communication devices and methods, and any one interaction series can be achieved via a combination of methods. For example, a text message from the user or primary contact could be converted to e-mail for the server to decode. Likewise, a text message from the server could be converted to automated voice for the user or primary contact. Each of these embodiments can be used to achieve the goals of the invention.

Figure 4A:
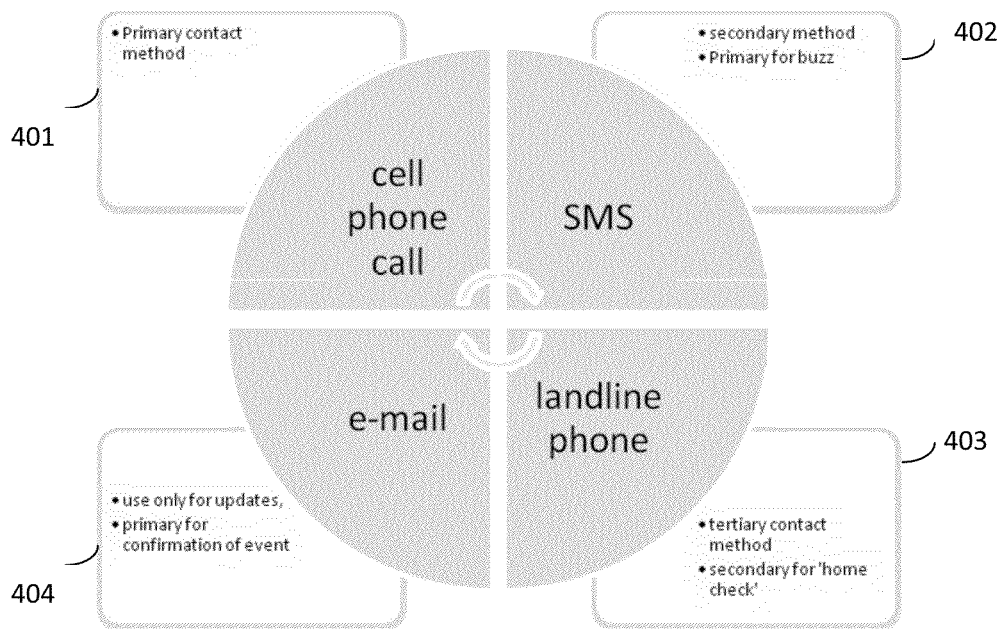
FIGS. 4A and 4B show examples of a technology selection in accordance with embodiments of the present invention.
Figure 4B:
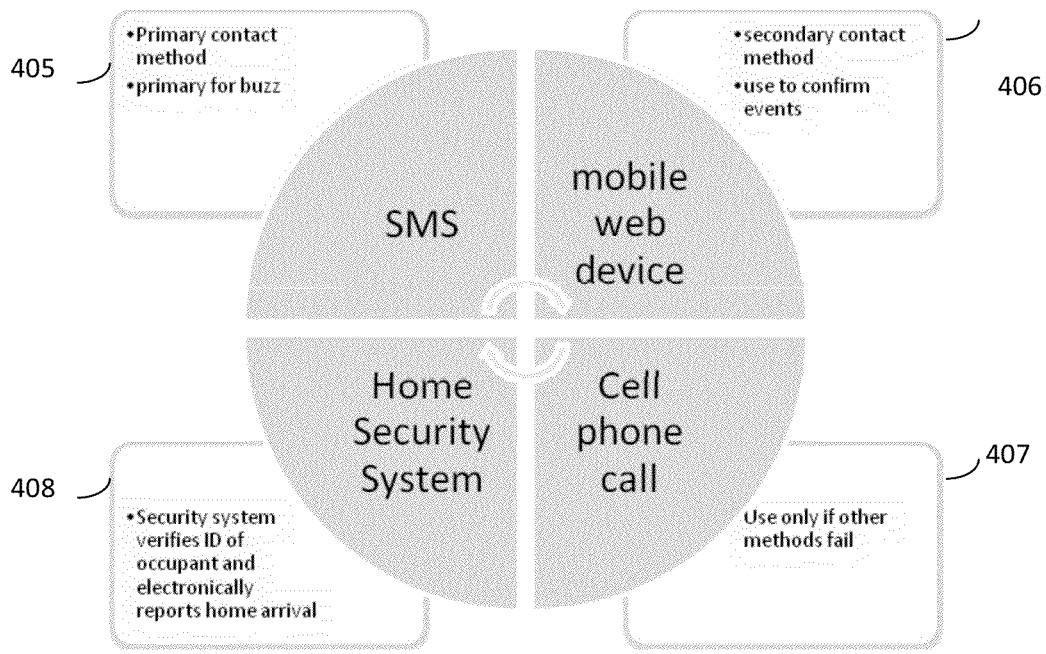

FIGS. 4A and 4B graphically demonstrates two embodiments of technology selection for interactive purposes. In FIG. 4A, a user or primary contact may want to be contacted, for most purposes, via cell phone using interactive voice response (IVR) (410). If they schedule an interruption of a meeting or perhaps even do not answer a cell phone contact attempt, the system may utilize a short message service (Short Message Service, or text) (402). For home arrival, the user may specify a second check to be with a landline phone (403) and a last method of contact may be by e-mail (404), which may be used for updates, event confirmation, and the like. In FIG. 4B, a user may have specified text messaging for most interactions (405) and perhaps may have specified the use of a mobile web device for confirmation and as a back-up method of contact (406). Cell phone call (407) may be specified as use when other attempts to contact the user fail, and perhaps just prior to escalation. A primary contact or user may further specify that rather than receiving a 'home check' call when the user is expected home, a trigger of a security system (408) may be utilized as confirmation a user has arrived home.

Once a user may be registered, they may be able to enter schedule information about events during which they would like the server to call, times they believe they may arrive home, and they may be able to request the server to attempt to verify information about any third party persons they may be meeting. FIG. 5*a* shows an example of a web page display (506) of a possible event registration perhaps for a functionality related to children and FIG. 5B shows an alternative set of fields (507) for event registration for a date. This may demonstrate the ease of utilizing a system for a disparate array of applications by simply changing the fields of question. FIG. 5C demonstrates the flexibility of secondary contacts or specified contacts per event (508). For example, contacts can be moved up in priority or removed completely, if perhaps, they are out of town, or simply too busy to help, or the like. Any information such as primary contact data, specified contact data, or the like may be changed via a calendar method or application. In embodiments, the same event scheduler can be used to schedule recurring events (509) regardless of the application as shown in FIG. 5D.

FIG. 5E shows an alternative example of an information page. A user could be required to fill out this information page with perhaps Date 411 (501) information and Date's Stuff information (502), and the like prior to registering an event, requesting a call or calls, and the like. This page can also be utilized to request an event confirmation (505) or perhaps even a background check (503, 504) on the individual and therefore, the site can also serve as a method for secondary contacts, emergency personal, and other authorized personal to not only to verify information about the last known whereabouts, but also find information about the third party person the user was meeting. This information could be stored in the user's database for future reference. Many crimes against online daters, for example, may be committed after some time has elapsed and some level of confidence in the individual has occurred, and then information initially available might not be retrievable. The system can archive such information so that it may be available for an extended period of time.

The user may choose to download the information entered to an electronic calendar or similar user database. Similarly, the user might upload information from their electronic or manual calendar to their site calendar, thus avoiding the need for multiple entries, and leaving a trackable record of interactions in the event of an emergency. Lastly, the information may be used to confirm the event with the subscriber and their date, for example, some period of time prior to the event.

A default contact preference may be selected at the time of registration, but can be modified thereafter perhaps via this form. The information stored from such electronic page may include, but is not limited to the location of the function including the address, a link to a map of said location, a link to the web site of the location or function, a phone number for the location or function, or the like. In addition, multiple destinations can be entered as well as agenda times such as expected arrival and departure times for said locations such that in case of an emergency, it may be easier to re-trace and investigate pertinent events. Information regarding the person the user or primary contact may be meeting with can include the manner in which they met, the known information about the third party person, a link to a photograph, any contact information that is known by the user or even acquired during the background search, and the like.

Other embodiments may include a system to ensure arrival of an individual while a user may be at a different location and/or may be unable to monitor the movement of a second person or primary contact. Accordingly, embodiments of the present invention may provide a system which calculates a location characteristic of a primary contact based on a contact communication from a primary contact. A location characteristic may include identification of a primary contact's physical location. When a system receives a contact communication from a primary contact, the contact communication data may represent a location or even a movement of a physical location of a primary contact. The contact communication data may be transformed into data identifying a location of a primary contact. For example, a system may be set up to contact a child after school to confirm that he/she has arrived home safely. When a system receives a contact communication from a primary user at the agenda time, it may be determined that the child had safely moved from school to home. Of course, this may be applicable to tracking movement between any two locations. A system may then automatically make a system response determination based on a calculated location characteristic and perhaps even compliance of a contact communication with distinct primary contact security verification data, as discussed above. If a system determines that a primary contact is correctly identified and is at a desired location, a system may respond by storing the decision and making no further contacts. In embodiments, a system may provide mapping of a calculated location characteristic representative of a location of a primary contact. This may include a visual depiction, GPS coordinate, or even a readable text representative of a location of a primary contact. On the other hand, if a system determines that a primary contact is not correctly identified and perhaps even is not at a desired location, a system may continue to contact the primary contact, may contact a specified contact, may proceed with an escalation response, or the like responses. Examples of system response determinations may include but are not limited to re-contacting said primary contact using said primary contact data; contacting a specified contact using said specified contact data; waiting a predetermined amount of time and contacting said primary contact using said primary contact data; fining said primary contact for a non-compliant contact communication; contacting an alternative communication device; storing said contact communication; contacting an emergency contact; re-contacting said primary communication device at a user specified time; communicating an exit methodology to said primary contact; and the like.

Figure 6:
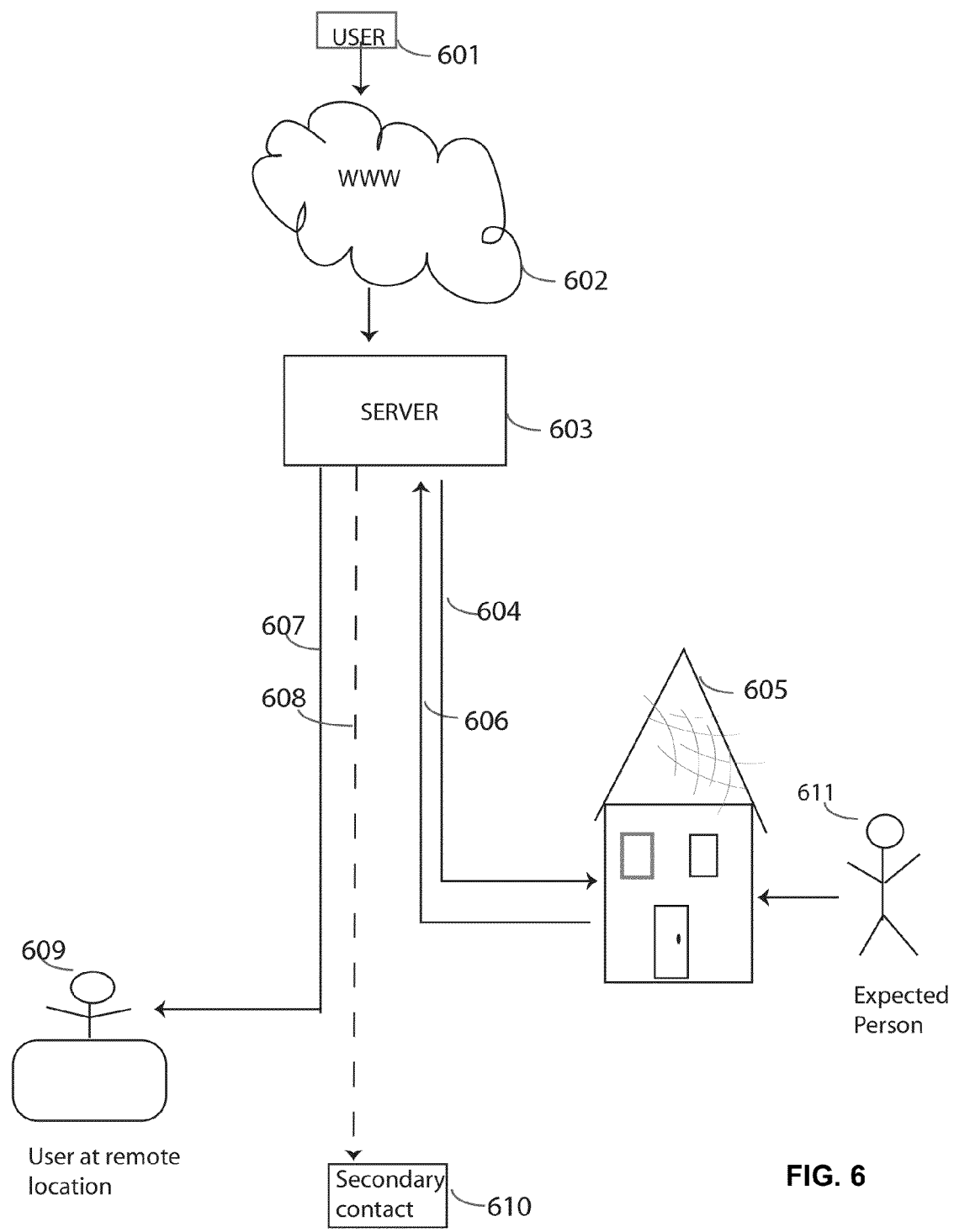
FIG. 6 is an example of a monitoring system in accordance with embodiments of the present invention.
Figure 7A:
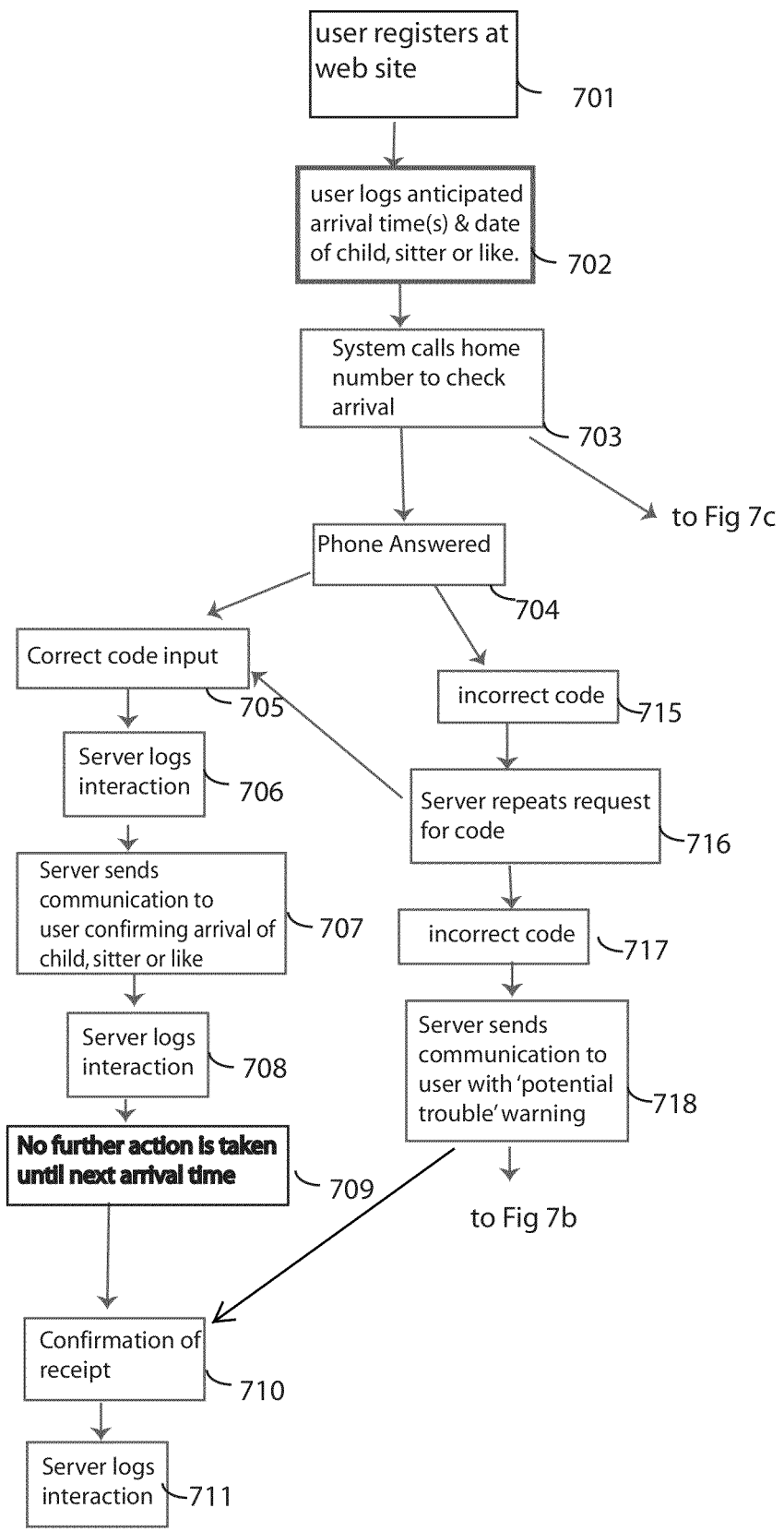
FIGS. 7A, 7B, 7C, and 7D shows a flow diagram of a monitoring system in accordance with embodiments of the present invention.
Figure 7B:
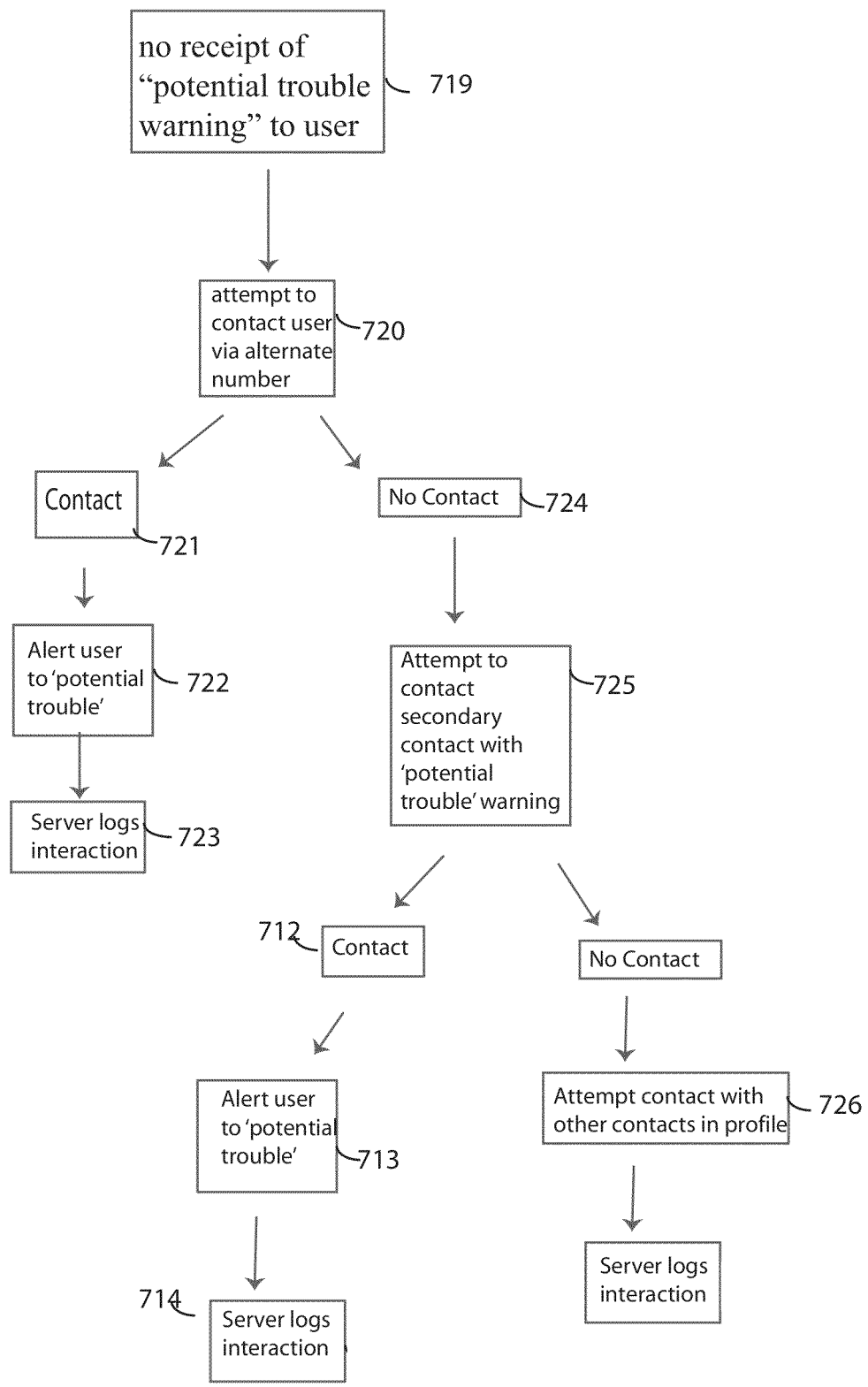
Figure 7C:
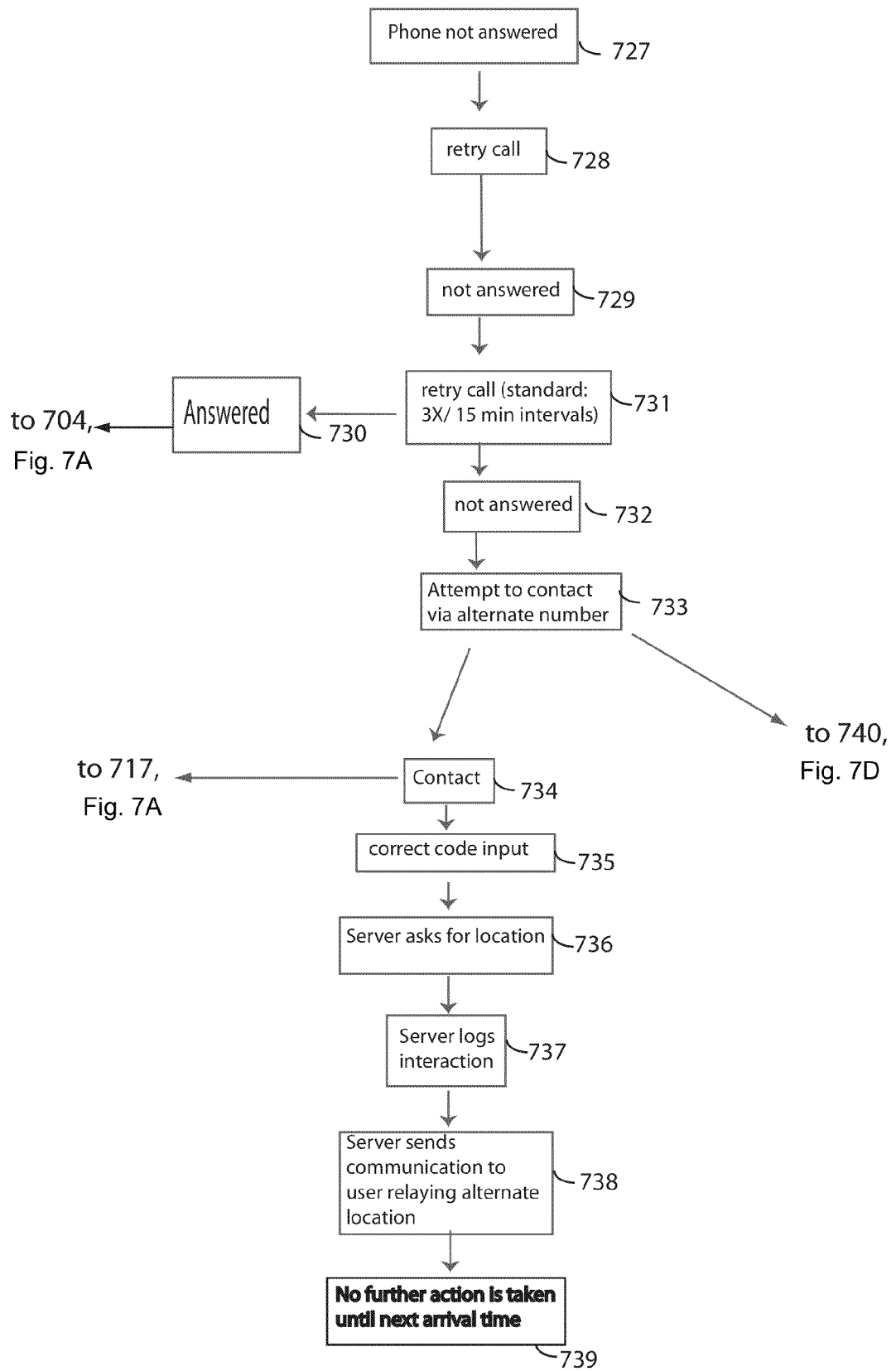
Figure 7D:
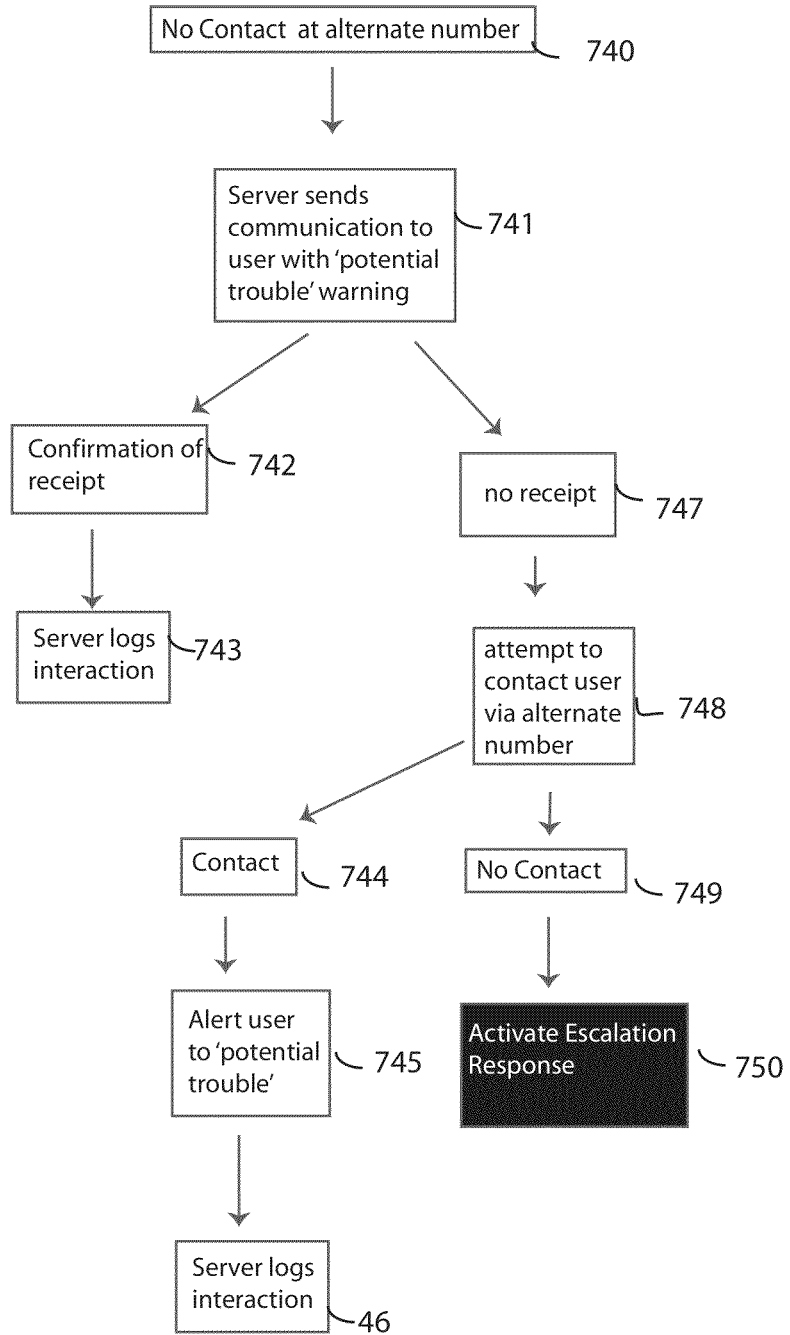

This may be shown simplistically in an overview in FIG. 6. A user (601) may register an input to a server (603) of their user schedule information via a communication device such as by using the world wide web (WWW) (602). User schedule information may include but is not limited to at least one agenda time, primary contact data, specified contact data, an expected arrival of a person (611) at a desired location, such as home (605), and the like. A server (603) may call the designated (home) number (604), and if the person has arrived, the server can receive a contact communication (606) when a person may answer the phone. In response, a server may send a message (607 or 608) or even predetermined message, to a specified or secondary contact (610) or even to a user (609) at a remote location, such message may be alerting them to the arrival. If perhaps the server is unable to make contact with the expected person (611) and the user (609), then it might make contact with a previously designated secondary contact (610). As such, a subscriber may be freed from the burdens associated with recall, monitoring, and the like.

FIGS. 7A, 7B, 7C, and 7D show a flow diagram representing an embodiment of the present invention as shown in FIG. 6. In this embodiment, a user may expect regular ingress and egress of a person or people, as may be represented by the term primary contact, and might best be explained utilizing the example of a child returning home from school. It should be understood however, that this example in no way limits the application, functionality or embodiments of the present invention. A subscriber or use which may include a parent or guardian may initially register via the world wide web or website (701) and may indicate preferred interactions, secondary contacts, the current information about the child or primary contact (emergency profile), the child's contact information, and the like (702).

At that time or perhaps even a future time the user may log-in and register a repetitive event they would like the server to monitor. They may select multiple user codes in order to correctly identify multiple people utilizing one communication device, and may register multiple times per day to monitor the same or different individuals. When a designated time arrives, the server may call the number to ascertain if an individual has arrived (703). In this example, location of the child may be determined by the physical location of the contact method (e.g. landline phone), via coordination with a GPS on a cellular phone, similar technology, or the like. If the phone is answered (704) and the correct code is input (705) then the server may log the interaction (706), may inform the user (707) of the location of the monitored person, and may even log the interaction (708). No further action may be needed until a next agenda time (709). Alternatively, a server may send a communication notice to a specified contact device. This communication notice may include but is not limited to notice of safe arrival, notice of completed contact, notice of lack of contact, notice of an escalation response needed, a recording of a contact communication, a mapped calculated location, and the like. It may possible for multiple people or primary contacts to be monitored at one location via the use of distinct codes or other verifiable identification methodology. The server can differentiate between people and can notify the subscriber of individual arrivals.

If the incorrect code is input (715), the server may ask (potentially up to several times) for the correct code (716). If the incorrect code is still input (717), the server may send a communication to a specified contact such as a subscriber or safety network (718) perhaps indicating the possible need for help. A specified contact may be required to acknowledge this type of communication with a confirmation of receipt (710) and a server may log the interaction (711). If a specified contact does not confirm receipt (719), the server may intelligently select alternate methods to contact a specified contact (720). If the server makes contact (721, 712) with a specified contact or even with an alternative specified contact, then it can alert them of the potential trouble (722, 713) and perhaps log the interaction (723, 714). If the server is unable to receive acknowledgement of a notification, then the server may contact a previously designated secondary or tertiary contact (724-726). Such alternate contacts may have been specified at the time of registration, but can be modified at any time, at the wishes of the user. Such notification may require the subscriber or safety network to affirm they will take responsibility and can diligently follow through to assess the safety of a user or primary contact such as their designee (child, for example). In response, a system may confirm a positive response from a specified or alternative contact to ensure responsibility has been confirmed.

If the server attempts to contact the person being monitored and the phone is not answered (727, 729), then the system may retry the call (728) perhaps according to a set of predetermined, user set, intervals (731). If the phone is answered (730) then the aforementioned scenario may be followed, see FIG. 7A, step 704. However, if the contacts are still not answered (732), the server may be attempted to contact the monitored person via alternate number(s) (733). If the person is contacted (734), a correct code may be input (735), the person's location can be ascertained (736), and perhaps even the server may log the interaction (737). A server may forward this information to the registered user (738) and no further action may be needed until a new agenda time (739).

As but one non-limiting example, if contact is made with a child on his/her cell phone, the server may ask and record their location information. This information can be forwarded to the parent, such as in the case of checking on children. If a contact cannot be made with the child (740), the server may send a communication to the registered user or specified contact with such an indication (741). As before, when there may be potential trouble, the server can request confirmation of receipt of communication from the specified contact (741) that may confirm they are now taking responsibility (742) and no further action is required on part of the server (743). If receipt cannot be obtained (747) within a given period of time, then a specified contact can be contacted via alternate number (748), or alternative contacts can be utilized (748) in an escalation response (750).

Figure 8:
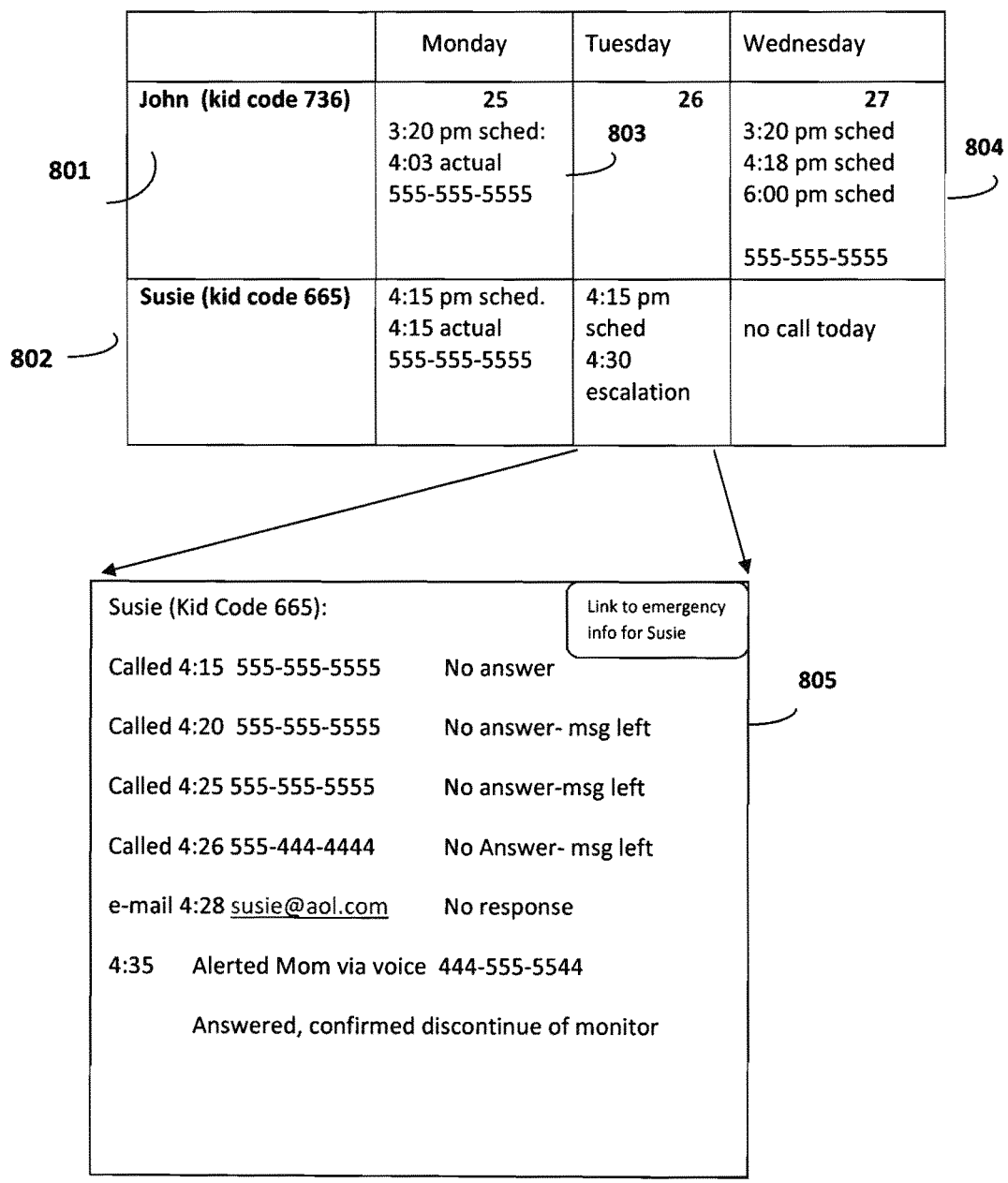
FIG. 8 shows an example of a screen display showing a calendar and log of past and future call interactions in accordance with embodiments of the present invention.

FIG. 8 shows an example of display of requests for calls as entered by a registered user. In this example, a user has entered information for two children (801, 802), has assigned identification codes, and entered contact times. A display may include, in embodiments, past schedules (803) and future schedules (804). Such calling schedule can be randomly generated by the server or by the user, enabling the user (e.g., a parent) to monitor their children. A display may include an escalation scenario outcome (805) which may includes those details to be recorded for user perusal. Such a calendar may be available to specified contacts, primary contacts, secondary and tertiary contacts, as well as legal authorities perhaps for use during an emergency. In addition, a calendar display may provide a link to an electronic page containing identifying information perhaps as input by the user/parent.

Figure 9A:
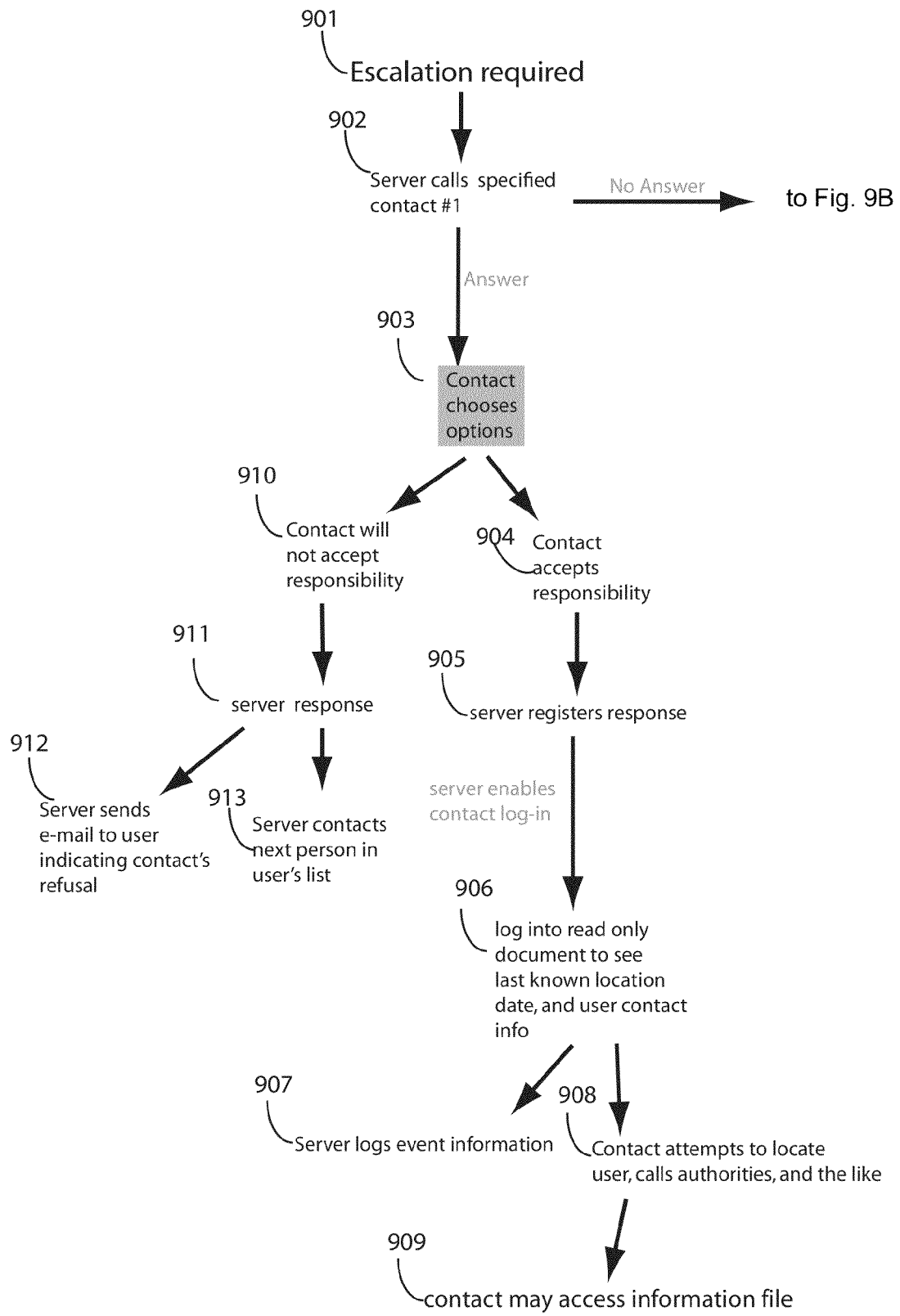
FIGS. 9A and 9B show a flow diagram of an escalation response of a monitoring system in accordance with embodiments of the present invention.
Figure 9B:
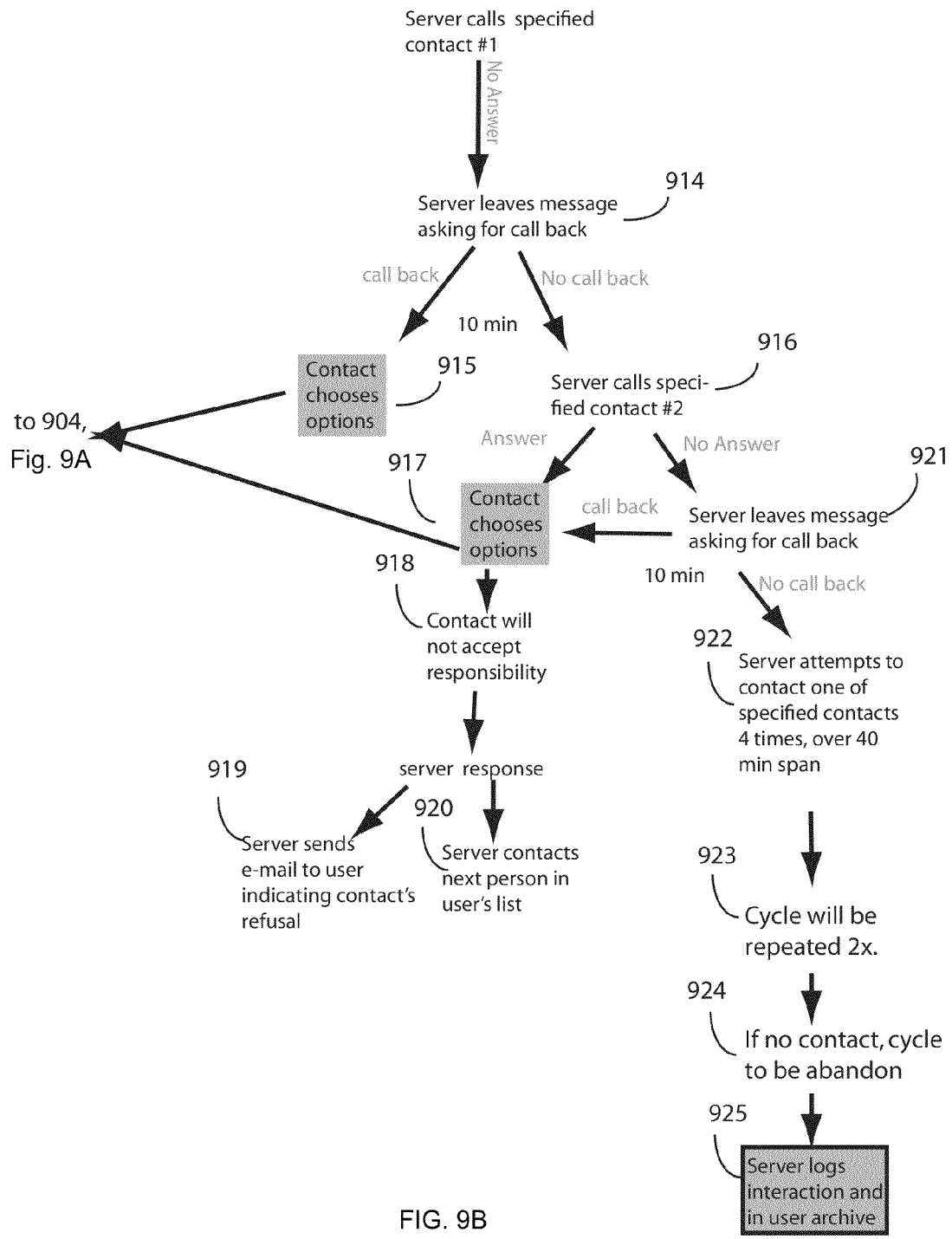

FIGS. 9A and 9B demonstrates an example of an escalation response if a person does not respond to repeated requests for contact. Examples may include, but are not limited to, a child not responding to calls on the home phone nor their cell phone, a person on a date not responding to their call when they are expected home, a person on a hike not responding when they are expected home, a senior citizen not responding to a wellness call, and the like. After trying all alternate contact methods for the person or primary contact, a server may escalate the situation (901) by attempting to call a first specified contact (902). If the specified contact answers, they have the option of taking responsibility for the situation (903) while the server may log the contact response (905). If the specified contact accepts responsibility (904), they can access information (906) about the individual primary contact perhaps including the last known location, contact information, and the like. The specified contact may then proceed to pursue a location of the individual primary contact, involve the authorities at their discretion, or the like (908). In this case, the server may not perform any more automated actions perhaps except to log the event and interactions in the user file (907). If a user (or their guardian) has previously completed an identifying information form, the specified contact can access this and forward it to the appropriate personnel (909). If the specified contact does not accept responsibility (910), the server may respond (911) and may contact the next person on the user's list (913). A server may send an e-mail to user (912) informing them of the event and perhaps even the outcome such that they may re-consider utilizing them as a contact, and the like.

If the server is unable to reach the first contact, it may leave a message (or some other type of interaction) which may requests an action (914). If the specified contact receives the request, and responds to it (915), they may optionally take responsibility as the aforementioned options and actions are followed such as shown in FIG. 9A. If no response is received from specified contact #1 after an elapsed period of time (for example, 10 minutes), a next contact may be tried (916) and perhaps a server may leave a message with the specified contact #1 (921). If the contact answers, they may have the option (917) to decline (918) or accept responsibility. If there is no answer and no call back, the server can attempt to make contact with each of the specified contacts (922) and perhaps can follow the same decision tree as outlined above. The entire cycle may be repeated a number of times (two in this example, 923) and if no contact can be made the cycle may be abandoned (924) and the interaction logged (925).

In yet another example, if a user is new to a city and may not have personal contacts, they may wish to use a local security company or other type of local response unit as their specified contacts or as their secondary or tertiary local contacts.

Other examples of home page displays for the functionality of children who are in 'self-care' or are 'latchkey kids' to be contacted when they are expected home or the functionality for a dating check in system.

Figure 10A:
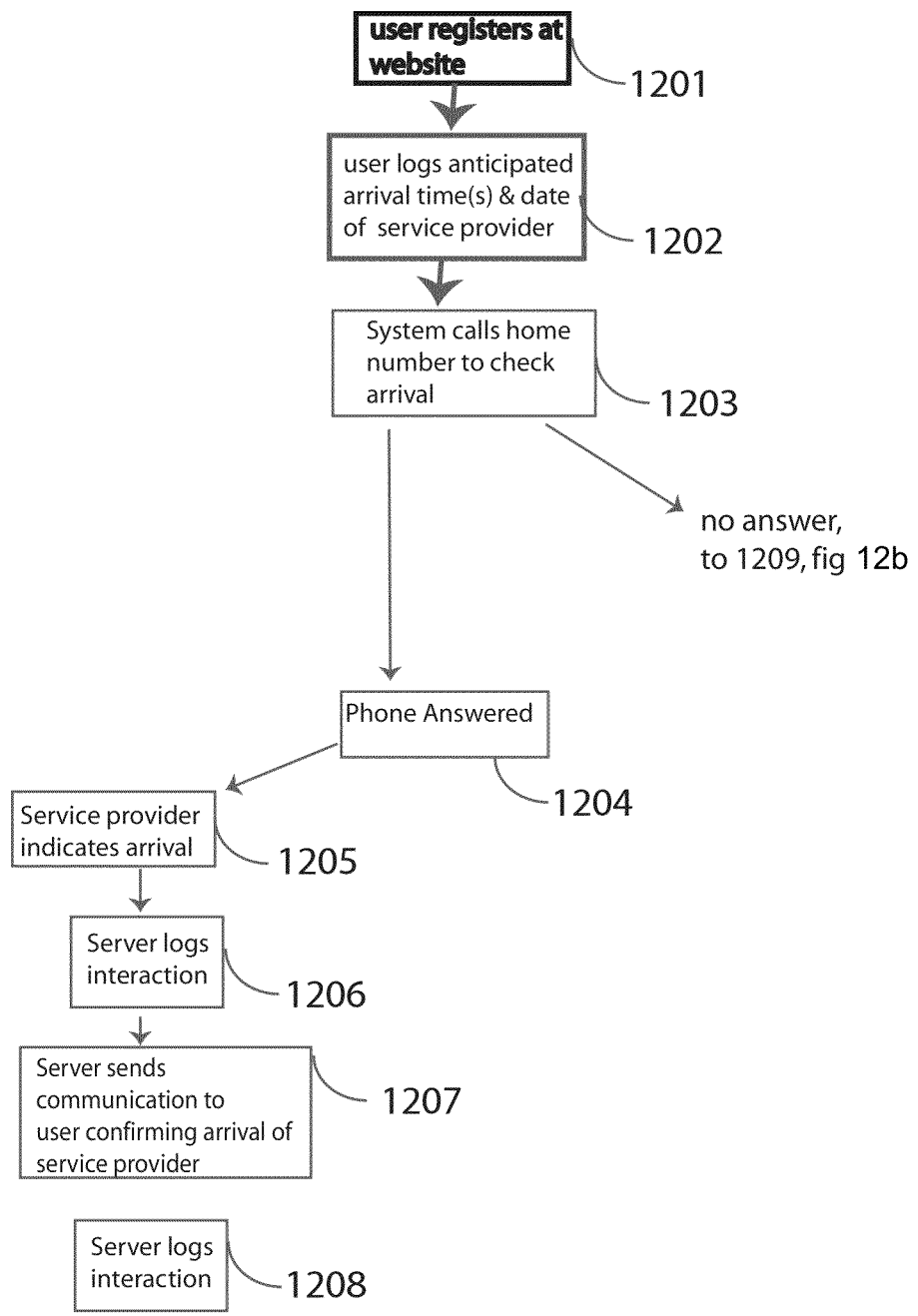
FIGS. 10A and 10Ba show a single event flow diagram in accordance with embodiments of the present invention.

FIG. 10A shows, in other embodiments, a single event user flow diagram of a software decision tree of the present invention. A user may use the system such as described in FIG. 2, for confirming arrival of a person for a single event, or the like uses. In such, an embodiment, the user may register at a website (1201) and may log an expected arrival time of a service provider (1202) at the same or perhaps a different time. At the time when the service provider is expected, the server may call the registered number (1203) and if the call is answered (1204), the server may process an indication of arrival (1205), may log the interaction (1206), may send an appropriate communication to the user (1207) and may even log the communication interaction (1208).

Figure 10B:
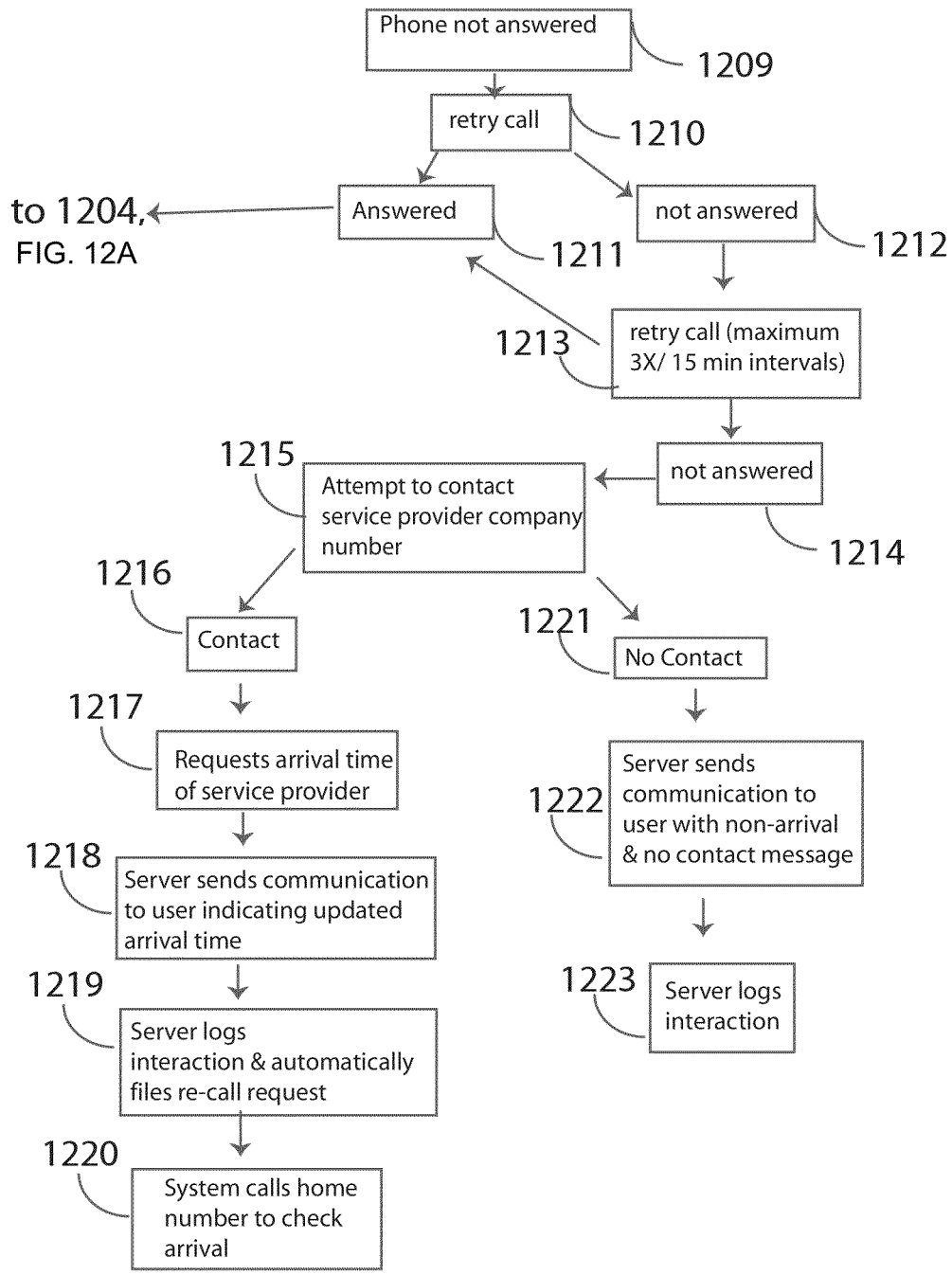

FIG. 10B demonstrates a possible scenario if the phone is not answered (1209). The server may re-try the call (1210) at distinct intervals and for a designated number of times. If the phone is still not answered (1212), the service provider's company may be contacted (1215, 1216) and the server may request an updated estimate of the service provider's arrival time (1217). The updated information may be forwarded to the user (1218) and the server may log the updated arrival time and may automatically register a request to assess arrival at the newly ascertained time (1219). If the server is unable to contact (1221) the service provider or provider's company, this information can be relayed to the user (1222) and the interaction may be logged (1223).

Figure 11:
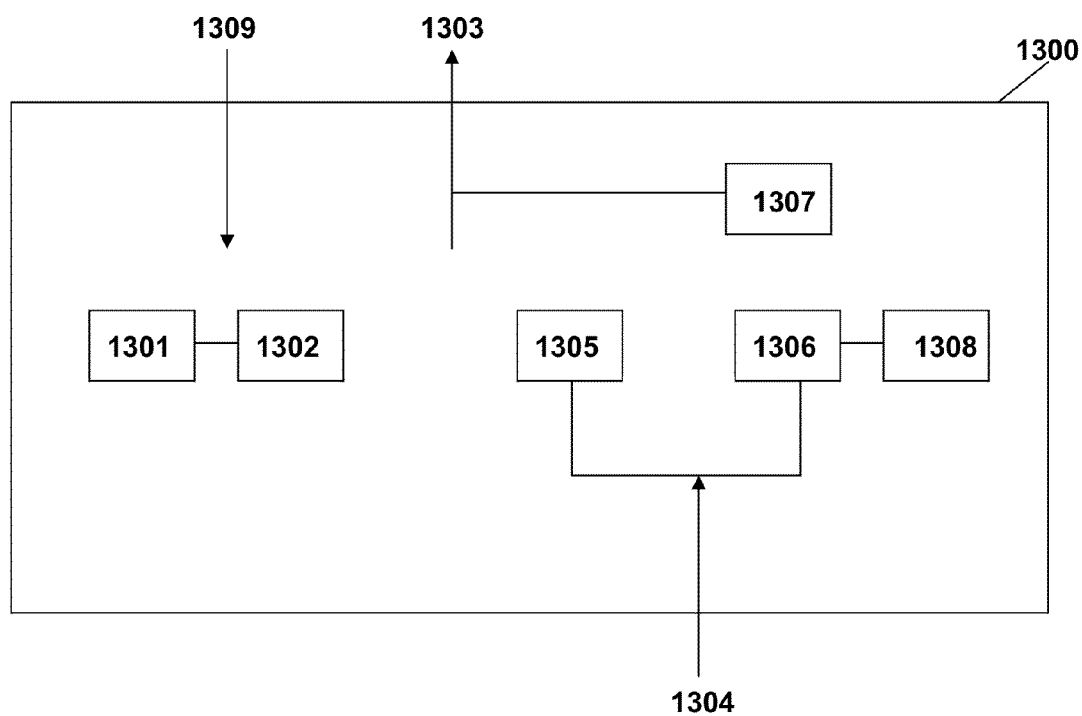
FIG. 11 shows an example representative of a monitoring system in accordance with embodiments of the present invention.

FIG. 11 demonstrates an example of a user monitoring system (1300) having a user information memory (1301) configured to accept and store inputted information (1309) such as user schedule information. An electronic calendar element (1302) may be responsive to a user information memory and may be configured to lodge an agenda time associated with primary contact data. An electronic calendar element may include a computerized internal calendar or clock for a system to determine when to make certain contact communications and the like. In embodiments, an electronic calendar element may include a contact communication schedule. A third party interactive communication output (1303) may be responsive to a user information memory and may provide a communication from a system to a contact. This may include a phone system, an internet system, an electrical data transmission system, a computer system, and the like. A primary contact communication input (1304) may be responsive to a third party interactive communication output and may include a communication, a contact communication entry, or perhaps even data relating to a communication received from a contact. This may include a phone call, a text message, an email or the like communications as discussed herein. A system may include an automated security verification comparator (1305) responsive to a primary contact communication input and configured to determine if a contact communication from a primary contact may comply with distinct primary contact security verification data. An automated security verification comparator may provide the computer calculations needed to automatically make comparisons as discussed herein. A location transformation determinant (1306) may be responsive to a primary contact communication input which may provide calculations or perhaps even transformation of data relating to a contact communication input into data relating to the physical location of a person. A system may include a hierarchical response element (1307) which may provide automated circuitry to allow a system to step through various routines and options when communicating with a contact, a user, or the like. In embodiments, a hierarchical response element may include an automated multiple directional response option generator, an automated instruction communication generator, and the like. Depending on the input received, the hierarchical response element can provide the appropriate next calculations or perhaps even steps. For example, a hierarchical response element may provide calculations to contact a primary user, to re-try a contact communication, to send a communication notice, to escalate communication actions, to generate an excuse for a primary contact to leave an agenda location, and the like steps. In addition, a system may include a store (1308) perhaps even a location transformation data store configured to store data representative of a location of a contact. A store (1308) may also provide a user retrieval element to allow a user or other person to retrieve stored data, communications, calculations, mapped location characteristics and the like.

It should be noted in all the aforementioned discussions, except as directed by the user, the embodiments of the system may not require human interaction. Human access may not be required or nor granted. All actions may be computer/server generated and may not require the involvement of operators, calling centers, or other human interference, thereby perhaps preserving the sanctity of a person's schedule and private information. It is also noted that in all the embodiments discussed herein, a system may be a computer system, may be a cloud computer system, may include application specific integrated circuits (ASIC) designed to perform any one of or any combination of functions as discussed herein, may include software routines stored in ROM, may include a processor configured with stored subroutines, and the like.

Examples of alternative claims may include:

1. A method of monitoring user activities comprising the steps of receiving an input from a communication device of user schedule information having at least one agenda time, primary contact data, and specified contact data; automatically storing said user schedule information in a computer storage memory component of a computer; registering a contact communication by said agenda time; automatically confirming said contact communication with a system compliant communication requirement; and providing an escalation response for a non-compliant contact communication.

2. A method of monitoring user activities according to claim 1 or any claim herein wherein said step of registering said contact communication by said agenda time is selected from the group consisting of registering a no-response contact communication; registering a phone call answer; registering a dialed digital response; registering a numeric response; registering a home security communication; registering a dialed "1"; registering a voice communication; registering Global Positioning System data; registering a security code; registering a dialed security code; registering a voiced security code; registering a biometric identification; registering a text message from a primary contact; registering a phone call from a primary contact; registering an email from a primary contact; registering a check out communication from a primary contact; registering a check in communication from a primary contact; registering a digital photograph at said agenda time; and registering a request for escalation.

3. A method of monitoring user activities according to claim 1 or any claim herein wherein said step of providing said escalation response for said non-compliant contact communication comprises an escalation response selected from the group consisting of contacting a primary communication device associated with a primary contact using said primary contact data; contacting a specified communication device associated with a specified contact using said specified contact data; waiting a predetermined amount of time and contacting a primary communication device associated with a primary contact using said primary contact data; fining a primary contact for said non-compliant contact communication; contacting an alternative communication device; and contacting an emergency service communication device associated with emergency services.

4. A method of monitoring user activities according to claim 1 or 3 or any claim herein and further comprising the step of sending a communication notice to a specified communication device associated with a specified contact using said specified contact data.

5. A method of monitoring user activities according to claim 1 or any claim herein wherein said communication device is selected from a group consisting of a computer, internet transmission source, email transmission source, phone, cellular phone, land line phone, text message, voice message, phone integrated with a device, phone integrated with a security system, and Personal Digital Assistant.

6. A method of monitoring user activities according to claim 4 or any claim herein wherein said specified communication device associated with said specified contact is selected from a group consisting of a computer, internet transmission source, email transmission source, phone, cellular phone, land line phone, text message, voice message, and Personal Digital Assistant.

7. A method of monitoring user activities according to claim 4 or any claim herein and further comprising the step of confirming a positive response from said specified contact.

8. A method of monitoring user activities according to claim 1 or any claim herein and further comprising the step of verifying accuracy of said primary contact data.

9. A method of monitoring user activities comprising the steps of:
receiving user schedule information having an agenda time, primary contact data, and distinct primary contact security verification data;
automatically calendaring said agenda time associated with said primary contact data;
automatically contacting a primary contact using said primary contact data at said agenda time through a primary communication device associated with said primary contact;
receiving a contact communication from said primary communication device associated with said primary contact;
automatically deciding if said contact communication from said primary communication device complies with said distinct primary contact security verification data;
calculating a location characteristic of said primary contact at said agenda time based on said contact communication;
automatically making a system response determination based on said calculated location characteristic and said compliance of said contact communication with said distinct primary contact security verification data; and
mapping said calculated location characteristic representative of a location of said primary contact at said agenda time.

10. A method of monitoring user activities according to claim 9 or any claim herein wherein said user schedule information further comprises specified contact data.

11. A method of monitoring user activities according to claim 9 or any claim herein wherein said step of receiving said user schedule information comprises the step of receiving said user schedule information through input from a communication device.

12. A method of monitoring user activities according to claim 9 or any claim herein wherein said step of automatically calendaring said agenda time associated with said primary contact data comprises the step of automatically calendaring said agenda time using a microprocessor.

13. A method of monitoring user activities according to claim 9 or any claim herein and further comprising the step of automatically storing said user schedule information in a computer storage memory component of a computer.

14. A method of monitoring user activities according to claim 9 or any claim herein and further comprising the step of automatically retrieving said user schedule information from said computer storage memory component at said agenda time.

15. A method of monitoring user activities according to claim 9 or any claim herein and further comprising the step of allowing retrieval of said calculated location characteristic.

16. A method of monitoring user activities according to claim 9 or any claim herein and further comprising the step of allowing retrieval of stored data selected from a group consisting of schedule information; agenda time; primary contact data; distinct primary contact security verification data; data relating to said contact communication; data relating to said location characteristic; data relating to said system response determination; and said calculated location characteristic.

17. A method of monitoring user activities according to claim 9 or any claim herein wherein said step of mapping said calculated location characteristic comprises the step of mapping said calculated location characteristic into a visual depiction representative of a location of said primary contact at said agenda time.

18. A method of monitoring user activities according to claim 9 or any claim herein wherein said step of mapping said calculated location characteristic comprises the step of mapping said calculated location characteristic into readable text representative of a location of said primary contact at said agenda time.

19. A method of monitoring user activities according to claim 9 or any claim herein wherein said step of calculating said location characteristic of said primary contact at said agenda time based on said contact communication comprises the step of transforming data of said contact communication into data identifying a location of primary contact.

20. A method of monitoring user activities according to claim 9 or any claim herein and further comprising the step of automatically storing said contact communication, said calculated location characteristic, and said system response determination on a computer storage memory component.

21. A method of monitoring user activities according to claim 9 or any claim herein wherein said user schedule information comprises information selected from a group consisting of an agenda address; a primary contact home address, and an address.

22. A method of monitoring user activities according to claim 21 or any claim herein and further comprising the step of calculating a Global Positioning System coordinate based on said user schedule information.

23. A method of monitoring user activities according to claim 9 or any claim herein wherein said location characteristic comprises identification of a primary contact's physical location.

24. A method of monitoring user activities according to claim 9 or any claim herein wherein said step of receiving said contact communication from said primary communication device comprises the step of receiving a contact communication selected from a group consisting of a no-response contact communication; a phone call answer; a dialed digital response; a numeric response; a home security communication; a dialed "1"; a voice communication; a Global Positioning System data; a security code; a dialed security code; a voiced security code; a biometric identification; a text message; a phone call; an email; a check out communication; a check in communication; a digital photograph; and a request for escalation.

25. A method of monitoring user activities according to claim 9 or any claim herein wherein said distinct primary contact security verification data is selected from a group consisting of caller identification information; a security code; a digital security code; a biometric identification; a voice identification; a digital photograph; an email address; a user name; a phone number; Global Positioning System information; and home security information.

26. A method of monitoring user activities according to claim 10 or any claim herein and further comprising the step of sending a communication notice to a specified communication device associated with a specified contact using said specified contact data.

27. A method of monitoring user activities according to claim 10 or any claim herein and further comprising the step of sending said mapped calculated location characteristic representative of said location of said primary contact at said agenda time to a specified contact using said specified contact data.

28. A method of monitoring user activities according to claim 9 or any claim herein wherein said primary contact data comprises a phone number, and wherein said primary contact comprises a child.

29. A method of monitoring user activities according to claims 9 or any claim herein wherein said primary contact data is selected from a group consisting of a phone number, an email address, a text message address, a cell phone number, and a home phone number.

30. A method of monitoring user activities according to claim 9 or any claim herein wherein said primary contact is selected from a group consisting of a child, a parent, a person, an elderly person, a single person, caregiver, pet sitter, service person, disabled person, and infirmed person.

31. A method of monitoring user activities according to claim 9 or any claim herein and further comprising the steps of recording said contact communication; and sending said recorded contact communication to a specified contact.

32. A method of monitoring user activities according to claim 9 or any claim herein wherein said primary contact data and said specified contact data comprise communication device data.

33. A method of monitoring user activities according to claim 9 or any claim herein wherein said agenda time comprises data selected from a group consisting of an arrival time, a departure time, a check in time, a check out time, and reoccurring event data.

34. A method of monitoring user activities according to claim 9 or any claim herein wherein said user schedule information further comprises escalation response preferences.

35. A method of monitoring user activities according to claim 9 or any claim herein wherein said user schedule information further comprises third party data.

36. A method of monitoring user activities according to claim 9 or any claim herein wherein said step of automatically making said system response determination based on said calculated location characteristic and said compliance of said contact communication with said distinct primary contact security verification data comprises a system response selected from a group consisting of re-contacting said primary contact using said primary contact data; contacting a specified contact using said specified contact data; waiting a predetermined amount of time and contacting said primary contact using said primary contact data; fining said primary contact for a non-compliant contact communication; contacting an alternative communication device; storing said contact communication; and contacting an emergency contact.

37. A method of monitoring user activities according to claim 9 or 36 or any claim herein and further comprising the step of receiving a subsequent contact communication from said primary communication device associated with said primary contact.

38. A method of monitoring user activities according to claim 11 or any claim herein wherein said communication device is selected from a group consisting of a computer, internet transmission source, email transmission source, phone, cellular phone, land line phone, text message, voice message, phone integrated with a device, phone integrated with a security system, and Personal Digital Assistant.

39. A method of monitoring user activities according to claim 26 or any claim herein wherein said specified communication device is selected from a group consisting of a computer, internet transmission source, email transmission source, phone, cellular phone, land line phone, text message, voice message, and Personal Digital Assistant.

40. A method of monitoring user activities according to claim 35 or any claim herein and further comprising a step of sending a communication notice to a third party communication device using said third party data.

41. A method of monitoring user activities according to claim 40 or any claim herein wherein said communication notice comprises confirmation of said agenda time.

42. A method of monitoring user activities according to claim 40 or any claim herein wherein said communication notice comprises a reminder of said agenda time.

43. A method of monitoring user activities according to claim 9 or any claim herein wherein said step of automatically contacting said primary contact comprises a contact method selected from a group consisting of sending an email; sending a text message; making a phone call; and contacting a home security system.

44. A method of monitoring user activities according to claim 10 or any claim herein and further comprising the step of confirming a positive response from a specified contact.

45. A method of monitoring user activities according to claim 9 or any claim herein and further comprising the step of verifying accuracy of said primary contact data.

46. A method of monitoring user activities comprising the steps of receiving an input from a communication device of user schedule information having an agenda time, primary contact data, and distinct primary contact security verification data; automatically storing said user schedule information in a computer storage memory component of a computer; automatically calendaring said agenda time associated with said user schedule information using a computer microprocessor; automatically retrieving said user schedule information at said agenda time; automatically contacting a primary contact using said primary contact data at said agenda time through a primary communication device associated with said primary contact; automatically providing multiple automated directional response options to said primary communication device at said agenda time; receiving a contact communication from said primary communication device associated with said primary contact; automatically making a system response determination based on said contact communication; automatically storing said contact communication from said primary communication device associated with said primary contact on said computer storage memory component of said computer; and allowing user retrieval of said user schedule information, said contact communication, and said system response determination.

47. A method of monitoring user activities according to claim 46 or any claim herein wherein said agenda time comprises data selected from a group consisting of an arrival time, a departure time, a check in time, and reoccurring event data.

48. A method of monitoring user activities according to claim 46 or any claim herein wherein said communication device is selected from a group consisting of a computer, internet transmission source, email transmission source, phone, cellular phone, land line phone, text message, voice message, and Personal Digital Assistant.

49. A method of monitoring user activities according to claim 46 or any claim herein wherein said step of automatically providing said multiple automated directional response options to said primary communication device at said agenda time comprises multiple automated directional response options selected from a group consisting of providing a call back option; providing a text message back option; providing an email back option; providing at least one excuse to leave option; providing an automated system contact to a specified contact option; providing an option to enter a security code; and providing an option to end supervision.

50. A method of monitoring user activities according to claim 46 or any claim herein wherein said step of receiving said contact communication from said primary communication device comprises the step of receiving a contact communication selected from a group consisting of a no-response contact communication; a phone call answer; a dialed digital response; a home security communication; a dialed "1"; a voice communication; a Global Positioning System data; a security code; a dialed security code; a voiced security code; a biometric identification; and a digital photograph.

51. A method of monitoring user activities according to claim 46 or any claim herein wherein said step of automatically making said system response determination based on said contact communication comprises the step of deciding if said contact communication complies with said distinct primary contact security verification data.

52. A method of monitoring user activities according to claim 51 or any claim herein wherein said distinct primary contact security verification data is selected from a group consisting of a security code; a digital security code; a biometric identification; a voice recognition; a digital photograph; Global Positioning System information; and home security information.

53. A method of monitoring user activities according to claim 46 or 50 or any claim herein wherein said step of automatically making a system response determination based on said contact communication comprises a system response determination selected from a group consisting of re-contacting said primary communication device associated with said primary contact; contacting a specified communication device associated with a specified contact using specified contact data; waiting a predetermined amount of time and contacting said primary communication device associated with said primary contact; fining said primary contact for said non-compliant contact communication; contacting an emergency service communication device associated with emergency services; re-contacting said primary communication device at a user specified time; and communicating an exit methodology to said primary contact.

54. A method of monitoring user activities according to claim 46 or any claim herein and further comprising the steps of receiving at least one directional response from said primary communication device associated with said primary contact; processing said at least one directional response with said computer microprocessor; and responding to said at least one directional response.

55. A method of monitoring user activities according to claim 54 or any claim herein wherein said step of responding to said at least one directional response comprises a step selected from a group consisting of re-contacting said primary communication device; saving said at least one directional response to said computer storage memory component; contacting a specified communication device associated with a specified contact using specified contact data; sending an exit methodology to said primary contact; and contacting an emergency service communication device associated with emergency services.

56. A method of monitoring user activities according to claim 46 or any claim herein and further comprising the step of sending a communication notice to a specified communication device associated with a specified contact using specified contact data.

57. A method of providing excusable departure from user activities comprising the steps of receiving user schedule information having an agenda time and primary contact data; automatically calendaring said agenda time associated with said primary contact data; calculating an instruction communication to provide to a primary contact an excuse to leave an agenda location; automatically contacting said primary contact at said agenda location using said primary contact data at said agenda time; automatically providing said instruction communication to said primary contact; automatically directing said primary contact to leave said agenda location; automatically receiving a contact communication from said primary contact; and recording an instruction communicative and a contact communicative relating to said instruction communication and said contact communication.

58. A user monitoring system comprising a user information memory configured to accept and store user schedule information having at least one agenda time, primary contact data, and specified contact data; a contact communication schedule responsive to said user schedule information; a contact communication entry; an automated verification comparator responsive to said contact communication entry configured to determine if said contact communication entry complies with a system compliant communication requirement; and a hierarchical escalation response element responsive to said contact communication entry and said automated verification comparator.

59. A user monitoring system comprising a user information memory configured to accept and store user schedule information having an agenda time, primary contact data, and distinct primary contact security verification data; an electronic calendar element responsive to said user information memory and configured to lodge said agenda time associated with said primary contact data within said electronic calendar element; a hired party interactive communication output responsive to said user information memory; a primary contact communication input responsive to said a third party interactive communication output; an automated security verification comparator responsive to said primary contact communication input configured to determine if a contact communication from a primary contact complies with said distinct primary contact security verification data; a location transformation determinant responsive to said primary contact communication input; a hierarchical response element responsive to said location transformation determinant and said automated security verification comparator and to which said is third party interactive communication output responsive; and a location transformation data store responsive to said location transformation determinant configured to store data representative of a location of said primary contact at said agenda time.

60. A user monitoring system comprising a user information memory configured to accept and store user schedule information having an agenda time, primary contact data, and distinct primary contact security verification data; an electronic calendar element responsive to said user information memory and configured to lodge said agenda time associated with said primary contact data within said electronic calendar element; a third party interactive communication output responsive to said user information memory; an automated multiple directional response option generator responsive to said electronic calendar element; a primary contact communication input responsive to said third party interactive communication output; a hierarchical response element responsive to said primary contact communication input; a primary contact communication data store responsive to said primary contact communication input; and a user retrieval element of said primary contact communication data store.

61. A discrete departure system comprising a user information memory configured to accept and store user schedule information having an agenda time and primary contact data; an electronic calendar element responsive to said user information memory and configured to lodge said agenda time associated with said primary contact data within said electronic calendar element; an automated instruction communication generator configured to generate an excuse for a primary contact to leave an agenda location; a third party interactive communication output responsive to said user information memory and said automated instruction communication generator; and a primary contact communication input responsive to said third party interactive communication output.

62. A system substantially as herein described with reference to any one or more of the Figures and Description.

63. The process according to claim 1, 9, 46, or 57 or any claim herein and further comprising any of the steps as shown in FIGS. 1-13, separately, in any combination or permutation.

As can be easily understood from the foregoing, the basic concepts of the present invention may be embodied in a variety of ways. It involves both monitoring techniques as well as devices to accomplish the appropriate monitoring system. In this application, the monitoring techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "input" should be understood to encompass disclosure of the act of "inputting"—whether explicitly discussed or not—and, conversely, were there effectively disclosure of the act of "inputting", such a disclosure should be understood to encompass disclosure of an "input" and even a "means for inputting." Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or in any the list of References or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the monitoring devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computer aspects and each aspect amenable to programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A server for tracking and providing emergency notifications for a plurality of mobile devices, the server comprising a processor and a computer readable storage medium having computer executable instructions stored thereon, the computer-executable instructions defining a server application executable by the processor of the server, the computer-executable instructions, when executed by the processor of the server, causing the server to perform steps comprising:
    defining virtual boundaries of a geographic area to be monitored;
    receiving a communication from one of said plurality of mobile devices indicating a user of that mobile device is involved in an emergency situation, the communication including GPS coordinates indicating a geographic location of the mobile device;
    determining from the GPS coordinates and the defined boundaries of the geographic area to be monitored that the mobile device from which the communication was received is located in that geographic area;
    displaying the location of the mobile device on an image of the geographic area being monitored, based on the received GPS coordinates.

2. The server recited in claim 1, wherein the computer-executable instructions further cause the server to associate a unique code with specific monitoring personnel who are to be notified in the event of an emergency within the defined boundaries of the geographic area.

3. The server recited in claim 2, wherein the communication received from the mobile device includes the unique code associated with the specific monitoring personnel, and wherein the computer-executable instructions further cause the server to, in response to receiving the communication from the mobile device:
    extract the unique code from the communication;
    determine the specific monitoring personnel associated with the unique code; and
    notify the determined specific monitoring personnel of the emergency situation indicated by the received communication.

4. The server recited in claim 1, wherein the server stores in a memory of the server, for each of the plurality of mobile devices, a profile containing information about a user of that mobile device, and wherein the computer-executable instructions further cause the server to, in response to receiving the communication from the mobile device, retrieve the profile stored for that mobile device and display information contained in the profile, wherein the displayed information comprises one or more of the name, a picture, health records, and class schedule of the user.

5. The server recited in claim 1, wherein the computer executable instructions further cause the server to, in response to receiving the communication from the mobile device, automatically send a communication to other mobile devices within the defined boundaries of the geographic area indicating that an emergency situation is occurring and providing instructions to keep away from the location of the mobile device from which the communication was received.

6. The server recited in claim 1, wherein the computer-executable instructions further cause the server to broadcast alerts to all of the plurality of mobile devices within the defined boundaries of the geographic area.

7. The server recited in claim 1, wherein the computer-executable instructions further cause the server to:
    receive successive communications from the mobile device over time with updated GPS coordinates in each communication;
    calculate from the received GPS coordinates a heading and speed of the mobile device; and
    report the heading and speed of the mobile device to an emergency responder.

8. The server recited in claim 1, wherein the defined virtual boundaries of the geographic area comprise a set of boundaries that define the physical boundaries of the geographic area.

9. The server recited in claim 1, wherein the defined virtual boundaries of the geographic area comprise a defined radius around a central location within the geographic area.

10. A server for tracking and providing emergency notifications for a plurality of mobile devices, the server comprising a processor and a computer readable storage medium having computer executable instructions stored thereon, the computer-executable instructions defining a server application executable by the processor of the server, the computer-executable instructions, when executed by the processor of the server, causing the server to perform steps comprising:
    defining different virtual boundaries for each of a plurality of different geographic areas to be monitored;
    for each of the different geographic areas to be monitored, establishing a unique code for that geographic area and associating the unique code with specific monitoring personnel who are to be notified in the event of an emergency within the defined boundaries of that geographic area, each unique code being associated with different specific monitoring personnel;
    receiving a first communication from one of said plurality of mobile devices indicating a user of that mobile device is involved in an emergency situation, the first communication including at least (i) GPS coordinates indicating a geographic location of the mobile device, and (ii) one of said unique codes;
    extracting the unique code from the first communication;
    determining the specific monitoring personnel associated with the extracted unique code; and
    notifying the determined specific monitoring personnel of the emergency situation indicated by the received first communication.

11. The server recited in claim 10, wherein the server stores in a memory of the server, for each of the plurality of mobile devices, a profile containing information about a user of that mobile device, and wherein the computer-executable instructions further cause the server to, in response to receiving the communication from the mobile device, retrieve the profile stored for the user of that mobile device and display information contained in the profile, wherein the displayed information comprises one or more of the name, a picture, health records, and class schedule of the user.

12. The server recited in claim 10, wherein the computer executable instructions further cause the server to, in response to receiving the first communication from the mobile device, automatically send a second communication to other mobile devices within the defined boundaries of the geographic area in which the mobile devices is located indicating that an emergency situation is occurring and providing instructions to keep away from the location of the mobile device from which the first communication was received.

13. The server recited in claim 10, wherein the computer-executable instructions further cause the server to broadcast alerts to all of the plurality of mobile devices within the defined boundaries of one of the geographic areas.

14. The server recited in claim 10, wherein the computer-executable instructions further cause the server to:

receive successive communications from the mobile device over time with updated GPS coordinates in each communication;

calculate from the received GPS coordinates a heading and speed of the mobile device; and report the heading and speed of the mobile device to an emergency responder.

15. The server recited in claim 10, wherein the defined virtual boundaries of each geographic area comprises a set of boundaries that define the physical boundaries of the geographic area.

16. The server recited in claim 10, wherein the defined virtual boundaries of each geographic area comprises a defined radius around a central location within the geographic area.

* * * * *